US 9,710,735 B2

(12) United States Patent
Mochizuki

(10) Patent No.: US 9,710,735 B2
(45) Date of Patent: Jul. 18, 2017

(54) PRINTER, PRINT CONTROL DEVICE, PRINT SYSTEM, PRINTING METHOD, AND COMPUTER-READABLE MEDIUM FOR PROVIDING SPECIFIC PRINT SETTING INFORMATION

(71) Applicant: FUJI XEROX CO., LTD., Tokyo (JP)

(72) Inventor: Akiko Mochizuki, Kanagawa (JP)

(73) Assignee: FUJI XEROX CO., LTD., Minato-ku, Tokyo (JP)

(*) Notice: Subject to any disclaimer, the term of this patent is extended or adjusted under 35 U.S.C. 154(b) by 0 days.

(21) Appl. No.: 15/241,138

(22) Filed: Aug. 19, 2016

(65) Prior Publication Data

US 2016/0358049 A1    Dec. 8, 2016

Related U.S. Application Data

(62) Division of application No. 14/206,202, filed on Mar. 12, 2014, now Pat. No. 9,454,718.

(30) Foreign Application Priority Data

Jul. 8, 2013  (JP) ................................. 2013-143090

(51) Int. Cl.
G06K 15/02    (2006.01)
H04N 1/00    (2006.01)

(52) U.S. Cl.
CPC ..... *G06K 15/1806* (2013.01); *G06K 15/1818* (2013.01); *G06K 15/1819* (2013.01);
(Continued)

(58) Field of Classification Search
None
See application file for complete search history.

(56) References Cited

U.S. PATENT DOCUMENTS

2009/0303524 A1* 12/2009 Kanekawa ............ G06F 9/5038
358/1.15
2009/0316189 A1* 12/2009 Yamauchi ............ G06F 21/608
358/1.15
(Continued)

FOREIGN PATENT DOCUMENTS

JP    2002-373061 A    12/2002
JP    2005-148994 A    6/2005
(Continued)

OTHER PUBLICATIONS

Communication dated Apr. 19, 2016 from Japanese Patent Office in counterpart Application No. 2013-143090.

*Primary Examiner* — Andrew H Lam
(74) *Attorney, Agent, or Firm* — Sughrue Mion, PLLC

(57) ABSTRACT

A printer includes a first receiver, a second receiver, a specifying unit, and a printing unit. The first receiver receives, from any of at least one print instruction information holding device that holds print instruction information giving instructions to print, specific print instruction information associated with a first identifier and instructing the printer to print. The second receiver receives, from a print settings information holding device that holds print settings information indicating settings for printing, specific print settings information associated with a second identifier and indicating settings for printing by the printer. The specifying unit, on the basis of the first identifier and the second identifier, specifies the specific print settings information as print settings information corresponding to the specific print instruction information. The printing unit uses the specific print settings information to conduct printing based on the specific print instruction information.

7 Claims, 16 Drawing Sheets

(52) U.S. Cl.
CPC ..... *H04N 1/00244* (2013.01); *H04N 1/00411* (2013.01); *H04N 2201/0082* (2013.01)

(56) References Cited

U.S. PATENT DOCUMENTS

2011/0273738 A1    11/2011   Tanaka et al.
2013/0148155 A1    6/2013   Kitagata

FOREIGN PATENT DOCUMENTS

| | | |
|---|---|---|
| JP | 2007-129766 A | 5/2007 |
| JP | 2010-221697 A | 10/2010 |
| JP | 2011-234194 A | 11/2011 |
| JP | 2013-119164 A | 6/2013 |
| JP | 2013-125349 A | 6/2013 |

\* cited by examiner

FIG. 10 finishings: staple-top-left
orientation-requested: reverse-portrait
print-service-url: http://cloud-a/print,
　　　　　　　　　http://cloud-b/print,
　　　　　　　　　......
service-account: user1_cloudA,
　　　　　　　　　user1_cloudB,
　　　　　　　　　......

PRINTER, PRINT CONTROL DEVICE, PRINT SYSTEM, PRINTING METHOD, AND COMPUTER-READABLE MEDIUM FOR PROVIDING SPECIFIC PRINT SETTING INFORMATION

CROSS-REFERENCE TO RELATED APPLICATIONS

This application is a Divisional of U.S. patent application Ser. No. 14/206,202, filed on Mar. 12, 2014, which claims priority from Japanese Patent Application No. 2013-143,090 filed Jul. 8, 2013, the contents of all of which are incorporated herein by reference in their entirety.

BACKGROUND

Technical Field

The present invention relates to a printer, a print control device, a print system, a printing method, and a computer-readable medium.

SUMMARY

According to an aspect of the invention, there is provided a printer that includes: a first receiver that receives, from any of at least one print instruction information holding device that holds print instruction information giving instructions to print, specific print instruction information associated with a first identifier and instructing the printer to print; a second receiver that receives, from a print settings information holding device that holds print settings information indicating settings for printing, specific print settings information associated with a second identifier and indicating settings for printing by the printer; a specifying unit that, on the basis of the first identifier and the second identifier, specifies the specific print settings information as print settings information corresponding to the specific print instruction information; and a printing unit that uses the specific print settings information to conduct printing based on the specific print instruction information.

BRIEF DESCRIPTION OF THE DRAWINGS

Exemplary embodiments of the present invention will be described in detail based on the following figures, wherein:

FIG. 10 is a diagram exemplifying information held by a print settings server or a cloud service bridge according to the third to fifth exemplary embodiments of the present invention;

DETAILED DESCRIPTION

Hereinafter, exemplary embodiments of the invention will be described in detail and with reference to the attached drawings.

First Exemplary Embodiment

Figure 1:
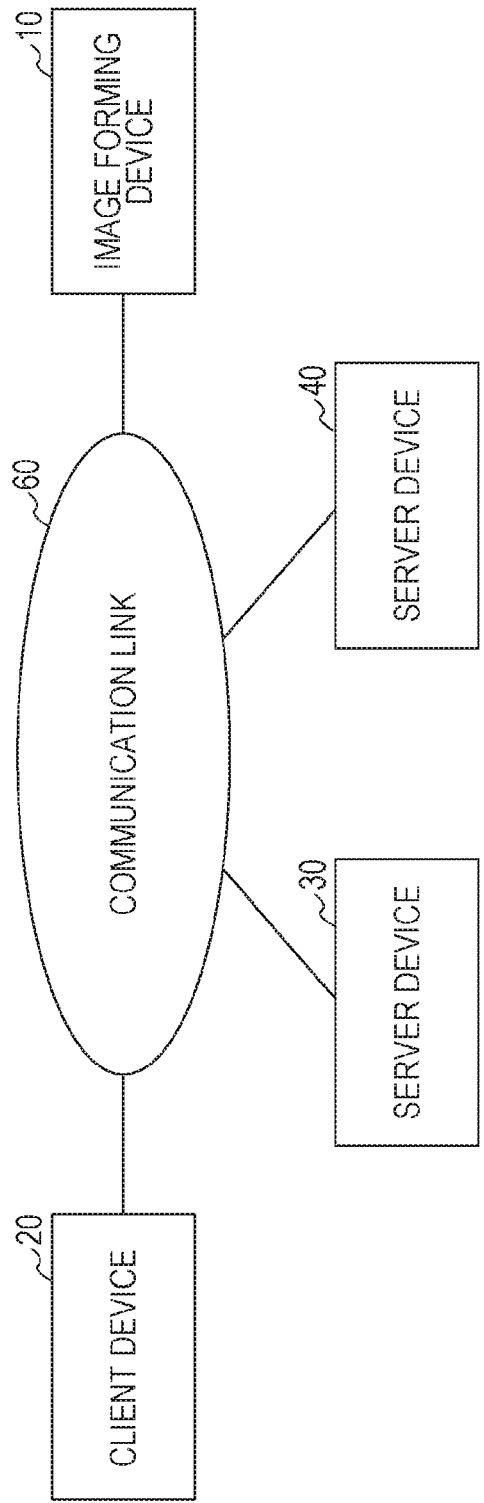
FIG. 1 is a diagram exemplifying an overall configuration according to the first to third and fifth exemplary embodiments of the present invention.

FIG. 1 is a diagram exemplifying an overall configuration according to the first exemplary embodiment of the present invention. An image forming device 10 is equipped with a document copying function, a function of scanning a document and generating scanned document image data, and a function of forming an image expressed by image data onto a sheet. A client device 20 receives information input by a user, and outputs information to the user.

Server devices 30 and 40 receive a request from the client device 20 and provide a service. The respective devices are connected to a communication link 60 that communicably connects devices to each other, and are capable of communicating with each other via the communication link 60. Note that although FIG. 1 illustrates one image forming device, one client device, and two server devices, two or more image forming devices or client devices, and three or more server devices may also be connected to the communication link 60.

Figure 2:
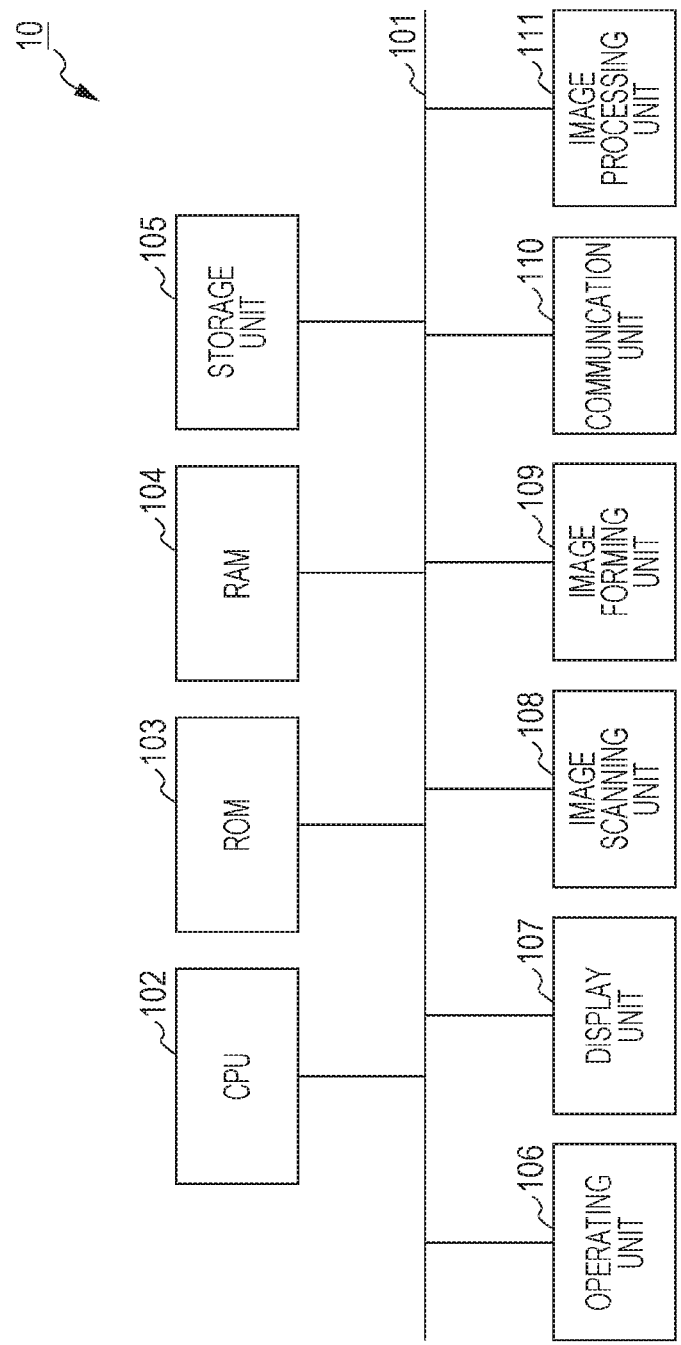
FIG. 2 is a block diagram exemplifying a hardware configuration of an image forming device 10 according to an exemplary embodiment of the present invention.

FIG. 2 is a block diagram exemplifying a hardware configuration of an image forming device 10 according to an exemplary embodiment. As illustrated in FIG. 2, the respective components of the image forming device 10 are connected to a bus 101, and exchange various data via this bus 101.

The operating unit 106 is equipped with multiple operable elements that receive user operations. The operable elements may be hardware keys. Additionally, an operable element may be configured as a touch panel that outputs a control signal according to a pressed position displayed on a display unit 107.

The display unit 107 is a display device that includes a liquid crystal display, for example. Under control by a CPU 102, the display unit 107 displays data a menu screen for operating the image forming device 10 or data related to the image forming device 10, for example.

An image scanning unit 108 is equipped with an image scanning device that scans a document to generate image data expressing an image of the scanned document, and outputs generated image data to an image processing unit 111.

An image forming unit 109 is equipped with an image forming mechanism that forms a toner image in accordance with image data on a recording medium, such as paper, for example, via an electrophotographic system.

A communication unit 110 is connected to the communication link 60, and functions as a communication interface that communicates with other devices connected to the communication link 60.

The image processing unit 111 applies image processing such as color correction and tone correction to an image expressed by input image data, and generates and outputs processed image data to the image forming unit 109.

A storage unit 105 is equipped with a storage device, and stores data received by the communication unit 110 or data generated by the image forming device 10, for example.

Read-only memory (ROM) 103 stores a control program executed by the central processing unit (CPU) 102. The CPU 102 retrieves a control program stored in the ROM 103, and executes the control program by using random access memory (RAM) 104 as a work area. When the control program is executed by the CPU 102, the respective components of the image forming device 10 are controlled by the CPU 102, enabling the image forming device 10 to form and output an image on a sheet, scan a document and generate document image data, and communicate with another device via the communication link 60, for example.

Note that a program executed by the CPU 102 may be provided in a recorded state on a computer-readable recording medium, such as a magnetic recording medium (such as magnetic tape or a magnetic disk), an optical recording medium (such as an optical disc), a magneto-optical recording medium, or semiconductor memory. In addition, such a program may also be downloaded to the image forming device 10 by using a communication medium such as the Internet.

Figure 3:
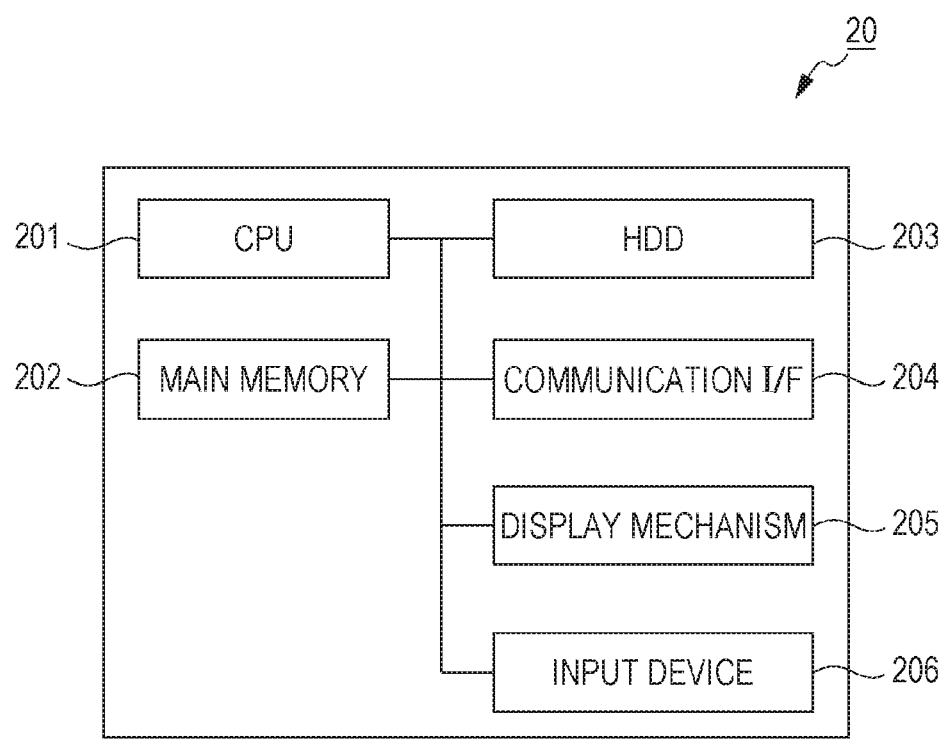
FIG. 3 is a block diagram exemplifying a hardware configuration of a client device or a server device according to an exemplary embodiment of the present invention.

FIG. 3 is a block diagram exemplifying a hardware configuration of a client device 20 according to an exemplary embodiment.

As illustrated in FIG. 3, the client device 20 is equipped with a CPU 201 as a computational component, as well as main memory 202 and a hard disk drive (HDD) 203 as storage components. Herein, the CPU 201 executes various software such as an operating system (OS) and applications, and realizes the respective functions to be discussed later. Also, the main memory 202 is a storage area that stores information such as various software and data used in the execution thereof, while the HDD 203 is a storage area that stores information such as input data that is input into various software and output data that is output from various software.

Furthermore, the client device 20 is equipped with a communication interface (hereinafter designated "communication I/F") 204 for communicating externally, a display mechanism 205 made up of video memory and a display or the like, and an input device 206 such as a keyboard and mouse.

FIG. 3 may also be interpreted as a block diagram exemplifying a hardware configuration of the server device 30. In this case, the CPU 201, the main memory 202, the HDD 203, the communication I/F 204, the display mechanism 205, and the input device 206 will be respectively designated the CPU 301, the main memory 302, the HDD 303, the communication I/F 304, the display mechanism 305, and the input device 306.

Additionally, FIG. 3 may also be interpreted as a block diagram exemplifying a hardware configuration of the server device 40. In this case, the CPU 201, the main memory 202, the HDD 203, the communication I/F 204, the display mechanism 205, and the input device 206 will be respectively designated the CPU 401, the main memory 402, the HDD 403, the communication I/F 404, the display mechanism 405, and the input device 406.

Note that a program executed by the CPU 201, 304, or 401 may be provided in a recorded state on a computer-readable recording medium, such as a magnetic recording medium (such as magnetic tape or a magnetic disk), an optical recording medium (such as an optical disc), a magneto-optical recording medium, or semiconductor memory. In addition, such a program may also be downloaded to the client device 20 or the server device 30 or 40 by using a communication medium such as the Internet.

Meanwhile, in the present exemplary embodiment, a cloud print server 30 is used as the server device 30 in FIG. 1. The cloud print server 30 provides a cloud service enabling a document to be printed by an image forming device 10 installed in a home, office, public place, or the like by using various devices as the client device 20 (hereinafter designated the "cloud print service"). Specifically, print instruction information giving instructions to print a document on an image forming device 10 is generated upon request from the client device 20 and accumulated until there is a query for the existence of print instruction information from that image forming device 10. When there is a query, a document image is generated in a format that is commonly processable by all image forming devices 10 is provided to that image forming device 10. Note that the provision of such a document image to the image forming device 10 is conducted by transmitting print instruction information including the document image to the image forming device 10. Hereinafter, referring to "print instruction information" means that the document image to be printed is also included.

Also, in the present exemplary embodiment, a print settings server 40 is used as the server device 40 in FIG. 1. The print settings server 40 provides a separate cloud service enabling print settings to be configured for printing using the cloud print service (hereinafter designated the "print settings service"). Whereas a cloud print service has the advantage of enabling printing without using a proprietary printer driver by the manufacturer of the image forming device 10, the manufacturer's proprietary functions that have been provided with printer drivers of the past may be unavailable. Accordingly, additional print settings that are unavailable on the cloud print service may be configured in the print settings service. Alternatively, print settings configured with the print settings service may be used instead of print settings configured with the cloud print service. Specifically, print settings information indicating additional or substitute print settings for printing a document on the image forming device 10 is generated upon request from the client device 20, and provided to that image forming device 10. Note that the client settings service may be specialized for individual models of the image forming device 10.

In addition, the image forming device 10 is configured to be able to connect to a communication link 60 such as the Internet. Services able to connect with the image forming device 10 include the cloud print service and the print settings service, and the image forming device 10 communicates with these services via a proxy server not illustrated in the drawings. Also, assume that the image forming device 10 is set to a state enabling print instruction information to be received from the cloud print service. Specifically, the image forming device 10 is registered with the cloud print service, and information related to the cloud print service is configured in the image forming device 10.

Figure 4:
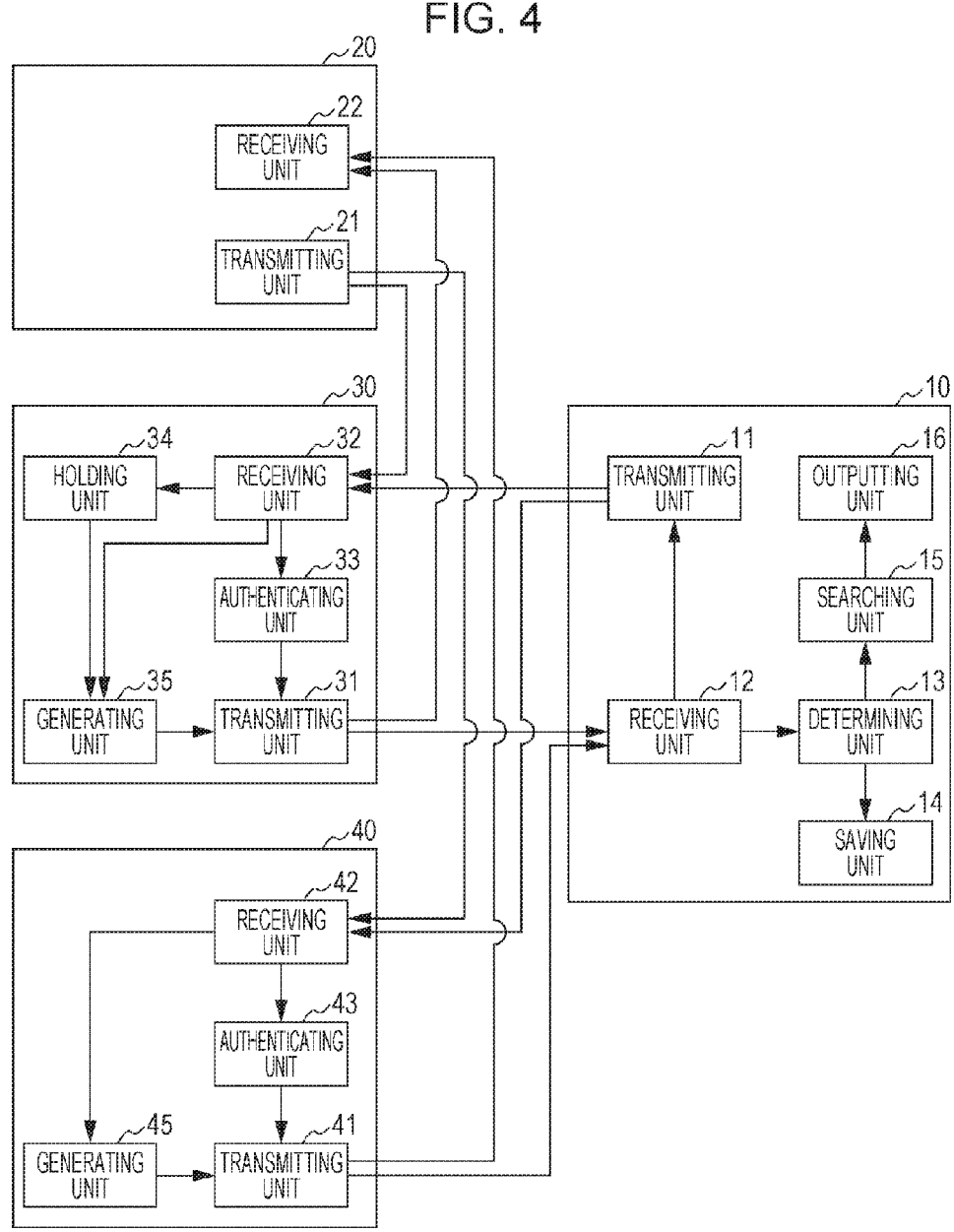
FIG. 4 is a block diagram exemplifying a functional configuration of respective devices according to the first and third exemplary embodiments of the present invention.

FIG. 4 is a block diagram exemplifying a functional configuration of the image forming device 10, the client device 20, the cloud print server 30, and the print settings server 40 according to the present exemplary embodiment.

As illustrated in FIG. 4, the image forming device 10 is equipped with a transmitting unit 11, a receiving unit 12, a determining unit 13, a saving unit 14, a searching unit 15, and an outputting unit 16. The transmitting unit 11 transmits polling data querying the existence of print instruction information to the cloud print server 30. The receiving unit 12 receives a generation notification reporting that print instruction information has been generated as well as print instruction information, including a user ID, from the cloud print server 30, and receives print settings information, including a user ID, from the print settings server 40. The determining unit 13 determines the type of data received by the receiving unit 12. In the case in which the determining unit 13 determines that the data is print settings information, the saving unit 14 saves the print settings information in the storage unit 105 (see FIG. 2). In the case in which the determining unit 13 determines that the data is print instruction information, the searching unit 15 searches the storage unit 105 for print settings information that includes the same user ID as the user ID included in the print instruction information. Also, in the case in which such print settings information is not in the storage unit 105, the searching unit 15 waits for subsequently received print settings information, and determines whether or not that print settings information includes the same user ID as the user ID included in the print instruction information. The outputting unit 16 outputs print data, including the print instruction information received by the receiving unit 12 and the print settings information found by the searching unit 15, to the image forming unit 109 (see FIG. 2) via the image processing unit 111 (see FIG. 2). In the present exemplary embodiment, the image forming device 10 is provided as an example of a printer. Also, the receiving unit 12 is provided as an example of a first receiver and a second receiver, the searching unit 15 is provided as an example of a specifying unit, and the image forming unit 109 is provided as an example of a printing unit.

The client device 20 is equipped with a transmitting unit 21 and a receiving unit 22. The transmitting unit 21 transmits information such as a user ID relevant to logging in to the cloud print service and the print settings service (hereinafter designated "login information"), and in additionally, transmits print settings for printing by the cloud print service to the cloud print server 30 and the print settings server 40, and transmits print instructions giving instructions to print using the cloud print service to the cloud print server 30. The receiving unit 22 receives responses to the information transmitted by the transmitting unit 21 from the cloud print server 30 and the print settings server 40. In the present exemplary embodiment, the client device 20 is provided as an example of a print instructing device.

The cloud print server 30 is equipped with a transmitting unit 31, a receiving unit 32, an authenticating unit 33, a holding unit 34, and a generating unit 35. The transmitting unit 31 transmits a generation notification reporting that print instruction information has been generated as well as print instruction information, including a user ID, to the image forming device 10. The receiving unit 32 receives login information relevant to logging into the cloud print service, print settings available on the cloud print service for printing by the cloud print service, and print instructions giving instructions to print using the cloud print service from the client device 20, and receives polling data querying the existence of print instruction information from the image forming device 10. The authenticating unit 33 conducts authentication on the basis of login information received by the receiving unit 32. The holding unit 34 holds print settings received by the receiving unit 32. The generating unit 35 generates and holds print instruction information on the basis of print instructions received by the receiving unit 32. In the present exemplary embodiment, the cloud print server 30 is provided as an example of a print instruction information holding device. Also, the receiving unit 32 is provided as an example of a receiver, and the generating unit 35 is provided as an example of a holding unit.

The print settings server 40 is equipped with a transmitting unit 41, a receiving unit 42, an authenticating unit 43, and a generating unit 45. The transmitting unit 41 transmits print settings information, including a user ID, to the image forming device 10. The receiving unit 42 receives login information relevant to logging into the print settings service and print settings unavailable on the cloud print service for printing by the cloud print service from the client device 20. The authenticating unit 43 conducts authentication on the basis of login information received by the receiving unit 42. The generating unit 45 generates and holds print settings information on the basis of print settings received by the receiving unit 42. In the present exemplary embodiment, the print settings server 40 is provided as an example of a print settings information holding device.

Figure 5:
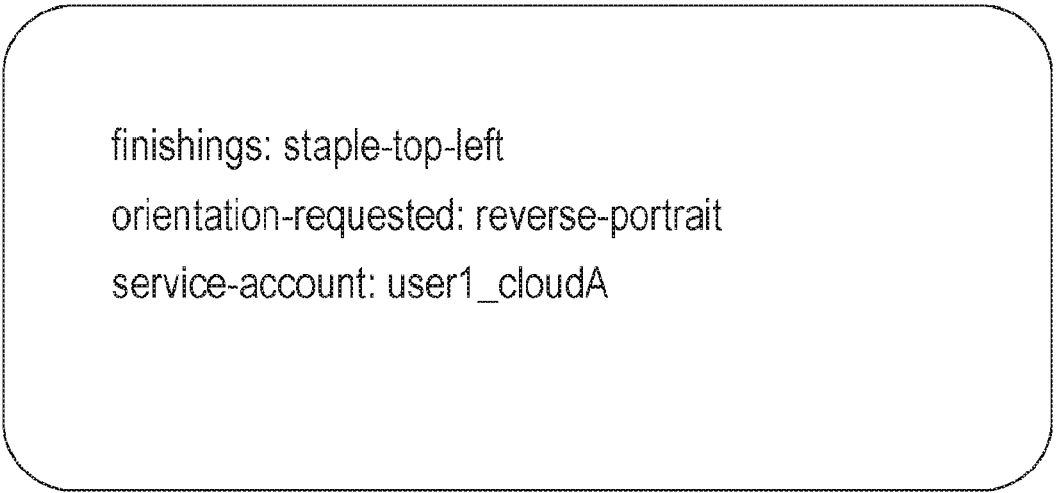
FIG. 5 is a diagram exemplifying information held by a print settings server according to the first and second exemplary embodiments of the present invention.

FIG. 5 is a diagram exemplifying information held by the print settings server 40. Among the information held by the print settings server 40, first, there is print settings information generated by the generating unit 45. In FIG. 5, the value "staple-top-left" is specified for the parameter "finishings", and the value "reverse-portrait" is specified for the parameter "orientation-requested", as the print settings information. The former indicates stapling at the top-left as a finishing process, while the latter indicates that the print orientation is set to portrait in a reverse orientation. Also, among the information held by the print settings server 40, there is information to be included in the print settings information and transmitted to the image forming device 10. In FIG. 5, the value "user1_cloudA" is specified for the parameter "service-account" as such information. This indicates that the user ID for logging into the cloud print service is "user1_cloudA". Note that herein, although the print settings information for one cloud print service is defined as one set of print settings information, as illustrated later in FIG. 10, print settings information for multiple cloud print services may also be defined as one set of print settings information. In addition, the print settings information may be used in common for all cloud print services, or used with one or multiple cloud print services from among multiple registered cloud print services. In this case, combinations of a relevant service ID and a user ID are included in the respective print settings information.

Figure 6:
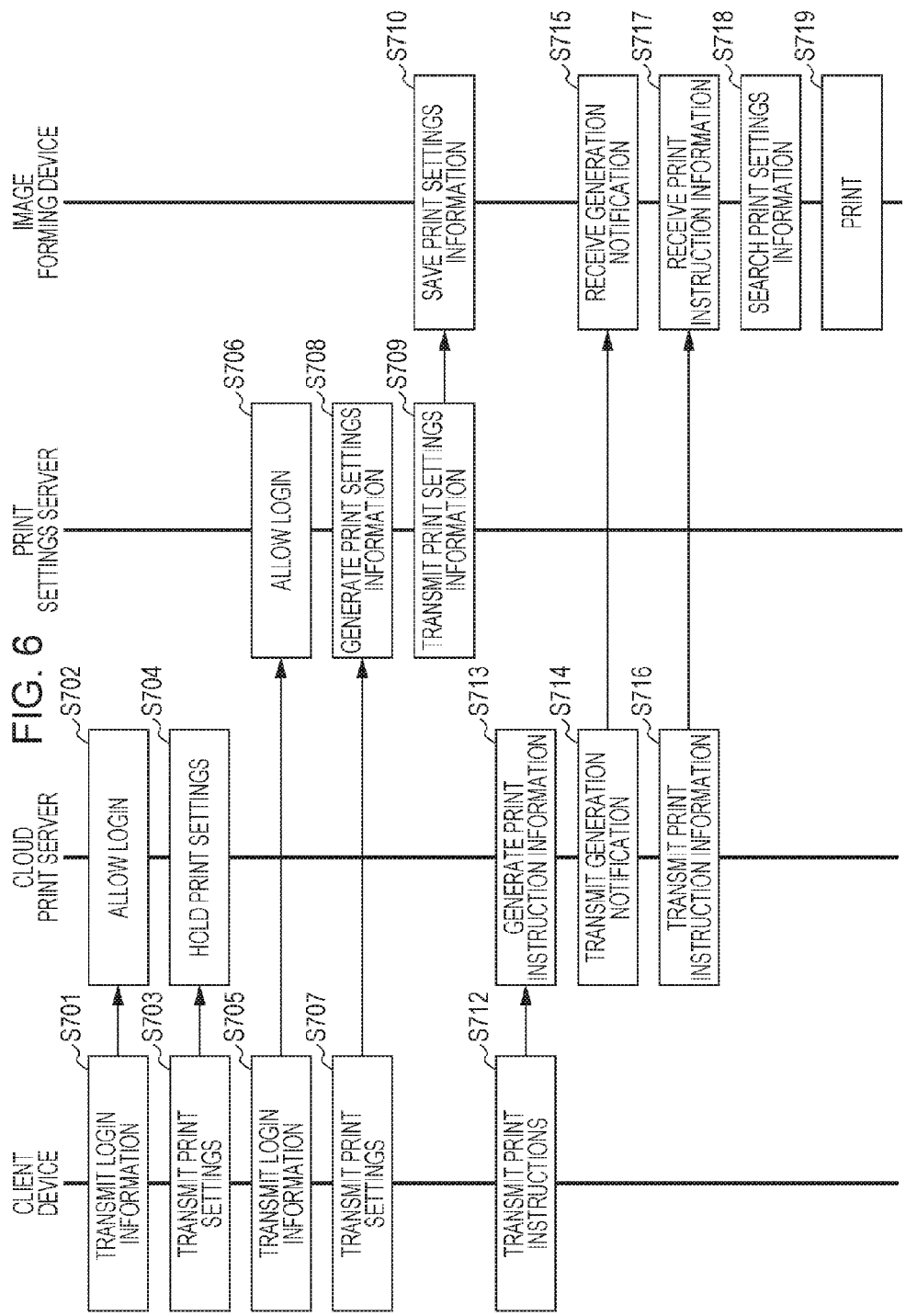
FIG. 6 is a sequence diagram illustrating first exemplary operation according to the first exemplary embodiment of the present invention.

FIG. 6 is a sequence diagram illustrating first exemplary operation according to the first exemplary embodiment.

First, a client device 20 such as mobile equipment, following instructions from a user, accesses a cloud print service and logs into the cloud print service with a preregistered user ID. Specifically, on the client device 20, the transmitting unit 21 transmits login information such as a user ID to the cloud print server 30 (step S701). Subsequently, on the cloud print server 30, the receiving unit 32 receives the login information, the authenticating unit 33 conducts authentication on the basis thereof, and allows login if authentication succeeds (step S702). Note that, although not illustrated in the drawings, information about whether or not login is allowed is passed from the authenticating unit 33 to the transmitting unit 31, and sent in reply from the transmitting unit 31 to the client device 20.

After that, the client device 20 configures print settings available on the cloud print service for an arbitrary document stored in the cloud print service. Specifically, on the client device 20, the transmitting unit 21 transmits print settings to the cloud print server 30 (step S703). Subsequently, on the cloud print server 30, the receiving unit 32 receives the print settings, and the holding unit 34 holds the print settings (step S704).

Meanwhile, in parallel to the above, the client device 20 also logs into the print settings service with the user ID. Specifically, on the client device 20, the transmitting unit 21 transmits login information such as a user ID to the print settings server 40 (step S705). Subsequently, on the print settings server 40, the receiving unit 42 receives the login information, the authenticating unit 43 conducts authentication on the basis thereof, and allows login if authentication succeeds (step S706). Note that, although not illustrated in the drawings, information about whether or not login is allowed is passed from the authenticating unit 43 to the transmitting unit 41, and sent in reply from the transmitting unit 41 to the client device 20.

After that, the client device 20 displays a print settings screen of the print settings service, and additionally configures print settings that are unavailable on the cloud print service for the above document stored in the cloud print service. In addition, the image forming device 10 to conduct the printing is also specified. Specifically, on the client device 20, the transmitting unit 21 transmits additional print settings, including information indicating the image forming device 10 to conduct the printing, to the print settings server 40 (step S707).

Next, the print settings server 40 generates print settings information indicating the additional print settings, and transmits the print settings information, including the user ID of the user using the client device 20, to the specified image forming device 10. Specifically, on the print settings server 40, the generating unit 45 generates print settings information (step S708), and the transmitting unit 41 transmits the print settings information, including the user ID, to the specified image forming device 10 (step S709). Note that although the print settings information may be transmitting using any protocol, herein it is assumed that the print settings information is transmitting using the print protocol used to transmit the print instruction information.

As a result, the image forming device 10 receives data, and upon determining that the data is print settings information, saves the print settings information in a storage unit 105 such as an internal HDD (see FIG. 2). Specifically, on the image forming device 10, the receiving unit 12 receives data, the determining unit 13 determines whether or not the data is print settings information, and if the data is determined to be print settings information, the saving unit 14 saves the print settings information in the storage unit 105 (step S710).

After that, the client device 20 gives instructions to print the above document stored in the cloud print service on the same image forming device 10. Specifically, on the client device 20, the transmitting unit 21 transmits print instructions to print a document on the image forming device 10 specified in step S707 to the cloud print server 30 (step S712). Subsequently, on the cloud print server 30, the receiving unit 32 receives the print instructions, and the generating unit 35 generates print instruction information on the basis of the print instructions (step S713). Note that this print instruction information also includes the print settings being held by the holding unit 34.

As a result, the cloud print server 30 notifies the image forming device 10 that print instruction information has been generated, and the image forming device 10 receives this notification and acquires print instruction information from the cloud print server 30. Specifically, on the cloud print server 30, the transmitting unit 31 transmits a generation notification reporting that print instruction information has been generated to the image forming device 10 (step S714). Subsequently, on the image forming device 10, the receiving unit 12 receives the generation notification (step S715), and although not illustrated in the drawings, the transmitting unit 11 polls the cloud print server 30. As a result, on the cloud print server 30, the transmitting unit 31 transmits print instruction information, including a user ID, to the image forming device 10 (step S716). Subsequently, on the image forming device 10, the receiving unit 12 receives the print instruction information (step S717). Note that in this case, since the determining unit 13 determines that the received data is print instruction information, the print instruction information is passed to the searching unit 15.

Next, the image forming device 10 extracts the user ID from the acquired print instruction information, and searches the storage unit 105 for print settings information having the same user ID. Specifically, the searching unit 15 searches user IDs included in print settings information stored in the storage unit 105 for the user ID included in the print instruction information passed from the determining unit 13 (step S718).

As a result, if print settings information having the user ID extracted from the print instruction information is found, the image forming device 10 conducts various printing using the print settings indicated by the print settings information. Specifically, the outputting unit 16 outputs print data, including the print instruction information received in step S717 and the print settings information found in step S718, to the image forming unit 109 (see FIG. 2) via the image processing unit 111 (see FIG. 2) (step S719). Consequently, in the image forming unit 109, a document image included in the print instruction information is printed using the print settings information.

Note that in the first exemplary operation, used print settings information may be deleted, or saved until user instructions are given.

Figure 7:
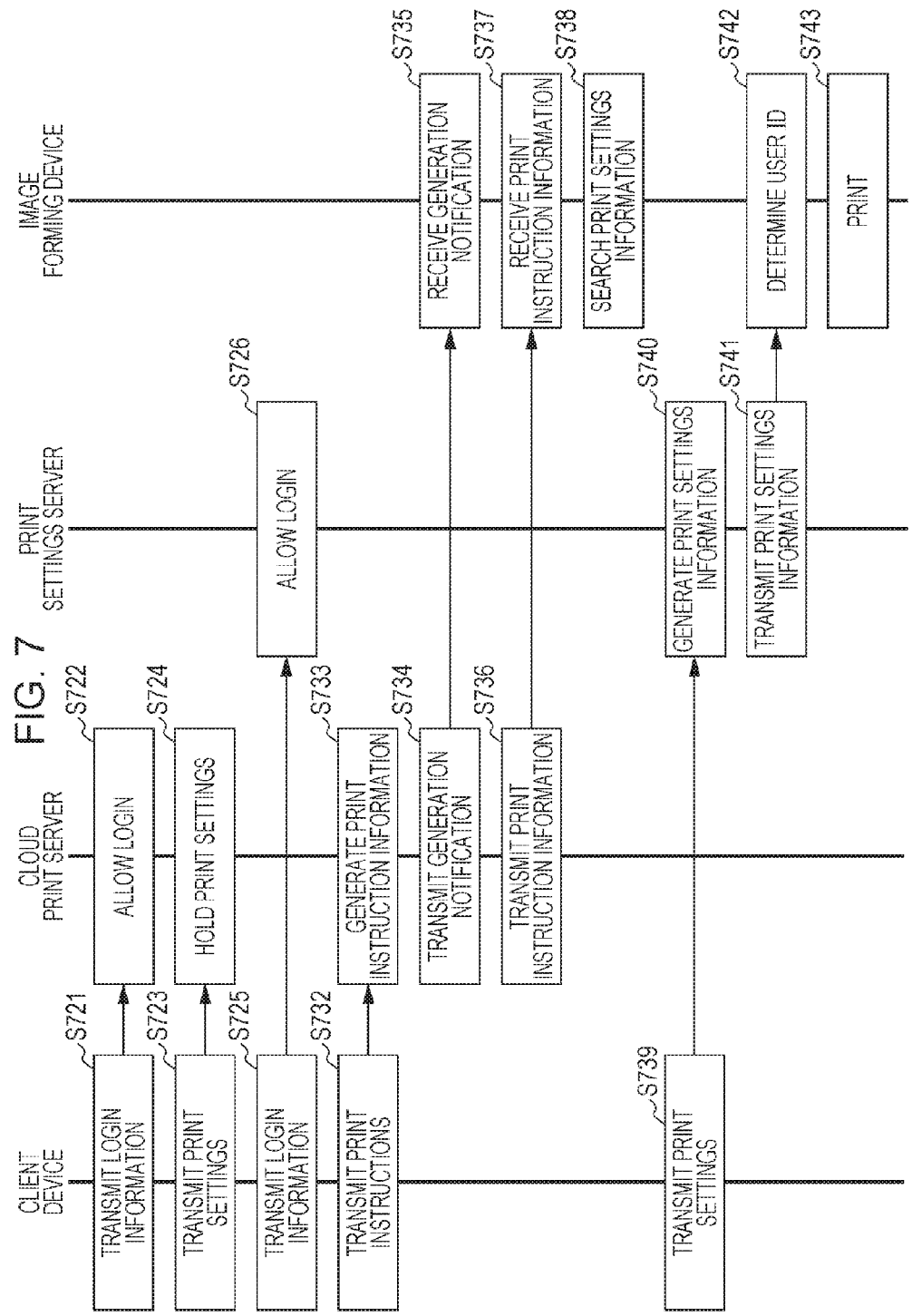
FIG. 7 is a sequence diagram illustrating second exemplary operation according to the first exemplary embodiment of the present invention.

FIG. 7 is a sequence diagram illustrating second exemplary operation according to the first exemplary embodiment.

In the first exemplary operation, the image forming device 10, after acquiring print instruction information, searches the storage unit 105 (see FIG. 2) for print settings information having the same user ID, but in some cases such print settings information may not be discovered. Conceivable examples of such cases are the case in which the user has not configured additional print settings, and the case in which print settings information indicating additional print settings configured by the user does not reach the image forming device 10 for some reason. Specifically, the former is the case of executing steps S721 to S726 corresponding to steps S701 to S706 in FIG. 6, not executing the steps corresponding to steps S707 to S710 that are subsequently executed in FIG. 6, and then executing steps S732 to S738 corresponding to steps S712 to S718 in FIG. 6.

Accordingly, in the case in which print settings information having the same user ID is not discovered when the image forming device 10 acquires print instruction information, the image forming device 10 temporarily defers printing based on the acquired print instruction information, and later receives subsequent data. Specifically, the image forming device 10 waits for the transmitting unit 21 on the client device 20 to transmit print settings to the print settings server 40 (step S739), the receiving unit 42 on the print settings server 40 to receive the print settings, the generating unit 45 to generate print settings information on the basis of the print settings (step S740), and the transmitting unit 41 to transmit the print settings information (step S741).

Then, in the case in which the subsequently received data is print settings information and also includes the same user ID as the user ID included in the deferred print instruction information, printing based on the deferred print instruction information is conducted using the print settings information received at this point. Specifically, if the receiving unit 12 receives print settings information, the saving unit 14 stores the print settings information in the storage unit 105 (see FIG. 2), and the searching unit 15 searches the user ID included in the print settings information newly stored in the storage unit 105 for the user ID included in the print instruction information passed from the determining unit 13. In other words, a determination is made regarding whether or not the user ID included in the print instruction information passed from the determining unit 13 is the same as the user ID included in the print settings information newly stored in the storage unit 105 (step S742). As a result, if these user IDs are determined to be the same, the outputting unit 16 outputs print data, including the print instruction information received in step S737 and the print settings information found in step S742, to the image forming unit 109 (see FIG. 2) via the image processing unit 111 (see FIG. 2) (step S743). Consequently, in the image forming unit 109, a document image included in the print instruction information is printed using the print settings information.

Note that in the second exemplary operation, deferred print instruction information may also be printed without using print settings information or deleted, such as after a predetermined time period elapses, or after receiving a predetermined number of sets of print instruction information.

Also, in the first exemplary embodiment, the print settings that the client device 20 transmits to the print settings server 40 are taken to be additional print settings with respect to the print settings that the client device 20 transmits to the cloud print server 30, but may also be taken to be substitute print settings with respect to the print settings that the client device 20 transmits to the cloud print server 30.

Second Exemplary Embodiment

Since an overall configuration according to the second exemplary embodiment of the present invention is the same as that exemplified in FIG. 1, description thereof will be reduced or omitted. Also, since the hardware configuration of an image forming device 10 according to the present exemplary embodiment is likewise the same as that exemplified in FIG. 2, description thereof will be reduced or omitted. Furthermore, the hardware configuration of a client device 20 and server devices 30 and 40 according to the present exemplary embodiment is likewise the same as that exemplified in FIG. 3, or deducible from that exemplified in FIG. 3, description thereof will be reduced or omitted.

Meanwhile, in the present exemplary embodiment, the cloud print server 30 is still used as the server device 30 in FIG. 1, and the print settings server 40 is still used as the server device 40 in FIG. 1. Since the cloud print server 30 and the print settings server 40 have been discussed in the first exemplary embodiment, description herein will be reduced or omitted.

Figure 8:
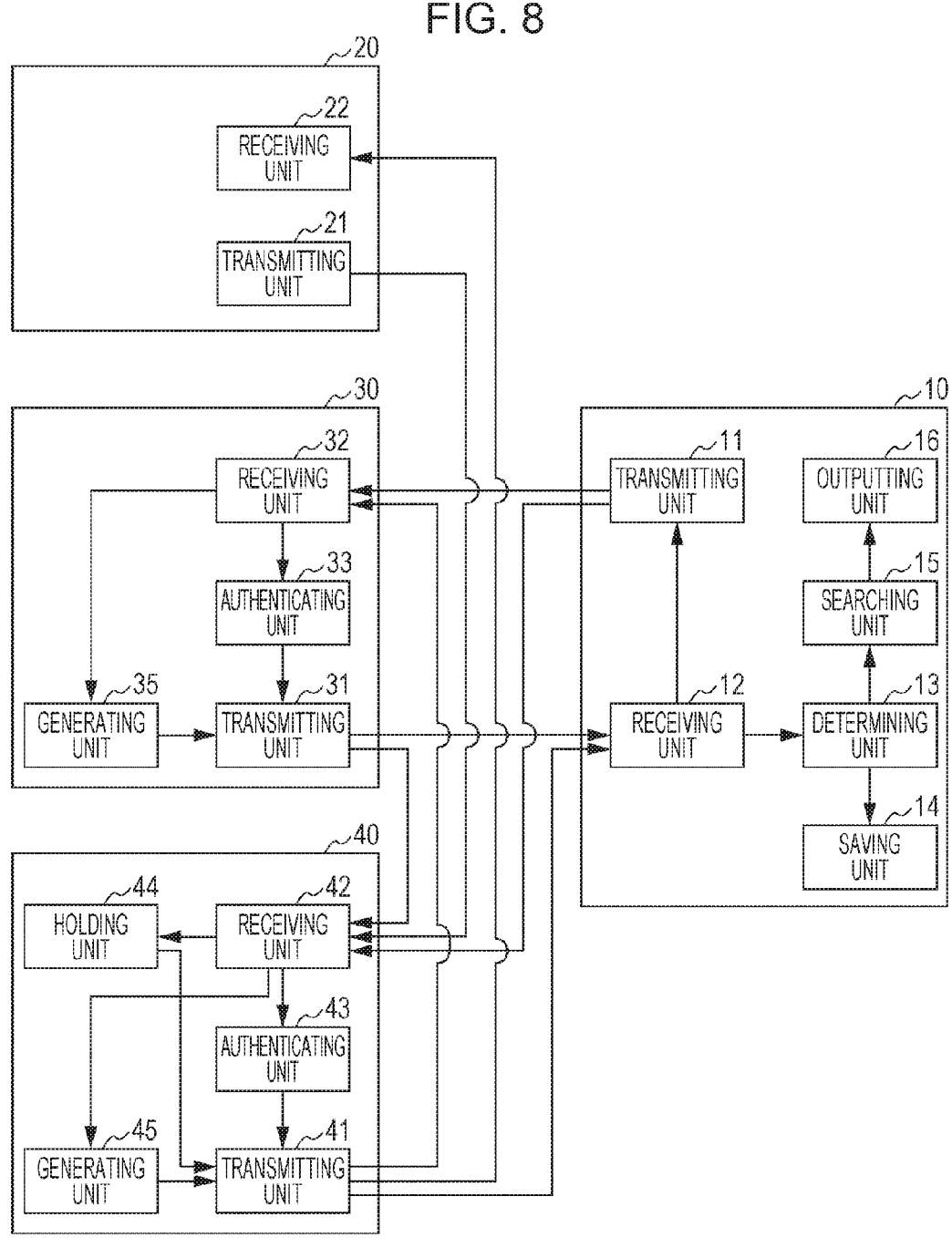
FIG. 8 is a block diagram exemplifying a functional configuration of respective devices according to the second exemplary embodiment of the present invention.

FIG. 8 is a block diagram exemplifying a functional configuration of the image forming device 10, the client device 20, the cloud print server 30, and the print settings server 40 according to the present exemplary embodiment.

As illustrated in FIG. 8, the image forming device 10 is equipped with a transmitting unit 11, a receiving unit 12, a determining unit 13, a saving unit 14, a searching unit 15, and an outputting unit 16. The transmitting unit 11 transmits polling data querying the existence of print instruction information to the cloud print server 30. The receiving unit 12 receives a generation notification reporting that print instruction information has been generated as well as print instruction information, including a user ID, from the cloud print server 30, and receives print settings information, including a user ID, from the print settings server 40. The determining unit 13 determines the type of data received by the receiving unit 12. In the case in which the determining unit 13 determines that the data is print settings information, the saving unit 14 saves the print settings information in the storage unit 105 (see FIG. 2). In the case in which the determining unit 13 determines that the data is print instruction information, the searching unit 15 searches the storage unit 105 for print settings information that includes the same user ID as the user ID included in the print instruction information. The outputting unit 16 outputs print data, including the print instruction information received by the receiving unit 12 and the print settings information found by the searching unit 15, to the image forming unit 109 (see FIG. 2) via the image processing unit 111 (see FIG. 2). In the present exemplary embodiment, the image forming device 10 is provided as an example of a printer. Also, the receiving unit 12 is provided as an example of a first receiver and a second receiver, the searching unit 15 is provided as an example of a specifying unit, and the image forming unit 109 is provided as an example of a printing unit.

The client device 20 is equipped with a transmitting unit 21 and a receiving unit 22. The transmitting unit 21 transmits login information relevant to logging into the print settings service, information specifying a cloud print service to use for printing (hereinafter designated "specifying information"), print settings for printing by the cloud print service, and print instructions giving instructions to print using the cloud print service to the print settings server 40. The receiving unit 22 receives responses to the information transmitted by the transmitting unit 21 from the print settings server 40. In the present exemplary embodiment, the client device 20 is provided as an example of a print instructing device.

The cloud print server 30 is equipped with a transmitting unit 31, a receiving unit 32, an authenticating unit 33, and a generating unit 35. The transmitting unit 31 transmits a generation notification reporting that print instruction information has been generated as well as print instruction information, including a user ID, to the image forming device 10. The receiving unit 32 receives login information relevant to logging into the cloud print service and print instructions giving instructions to print using the cloud print service from the print settings server 40, and receives polling data querying the existence of print instruction information from the image forming device 10. The authenticating unit 33 conducts authentication on the basis of the login information received by the receiving unit 32. The generating unit 35 generates and holds print instruction information on the basis of print instructions received by the receiving unit 32. In the present exemplary embodiment, the cloud print server 30 is provided as an example of a print instruction information holding device. Also, the receiving unit 32 is provided as an example of a receiver, and the generating unit 35 is provided as an example of a holding unit.

The print settings server 40 is equipped with a transmitting unit 41, a receiving unit 42, an authenticating unit 43, a holding unit 44, and a generating unit 45. The transmitting unit 41 transmits login information relevant to logging into the cloud print service and print instructions giving instructions to print using the cloud print service to the cloud print server 30, and transmits print settings information, including a user ID, to the image forming device 10. The receiving unit 42 receives login information relevant to logging into the print settings service, specifying information that specifies a cloud print service to use for printing, print settings for printing by the cloud print service, and print instructions giving instructions to print using the cloud print service from the client device 20. The authenticating unit 43 conducts authentication on the basis of login information received by the receiving unit 42. The holding unit 44 holds specifying information received by the receiving unit 42. The generating unit 45 generates and holds print settings information on the basis of print settings received by the receiving unit 42. In the present exemplary embodiment, the print settings server 40 is provided as an example of a print settings information holding device. Also, the receiving unit 42 is provided as an example of a receiver, and the transmitting unit 41 is provided as an example of a transmitter.

Note that since the information held by the print settings server 40 is the same as that exemplified in FIG. 5, description herein will be reduced or omitted.

Figure 9:
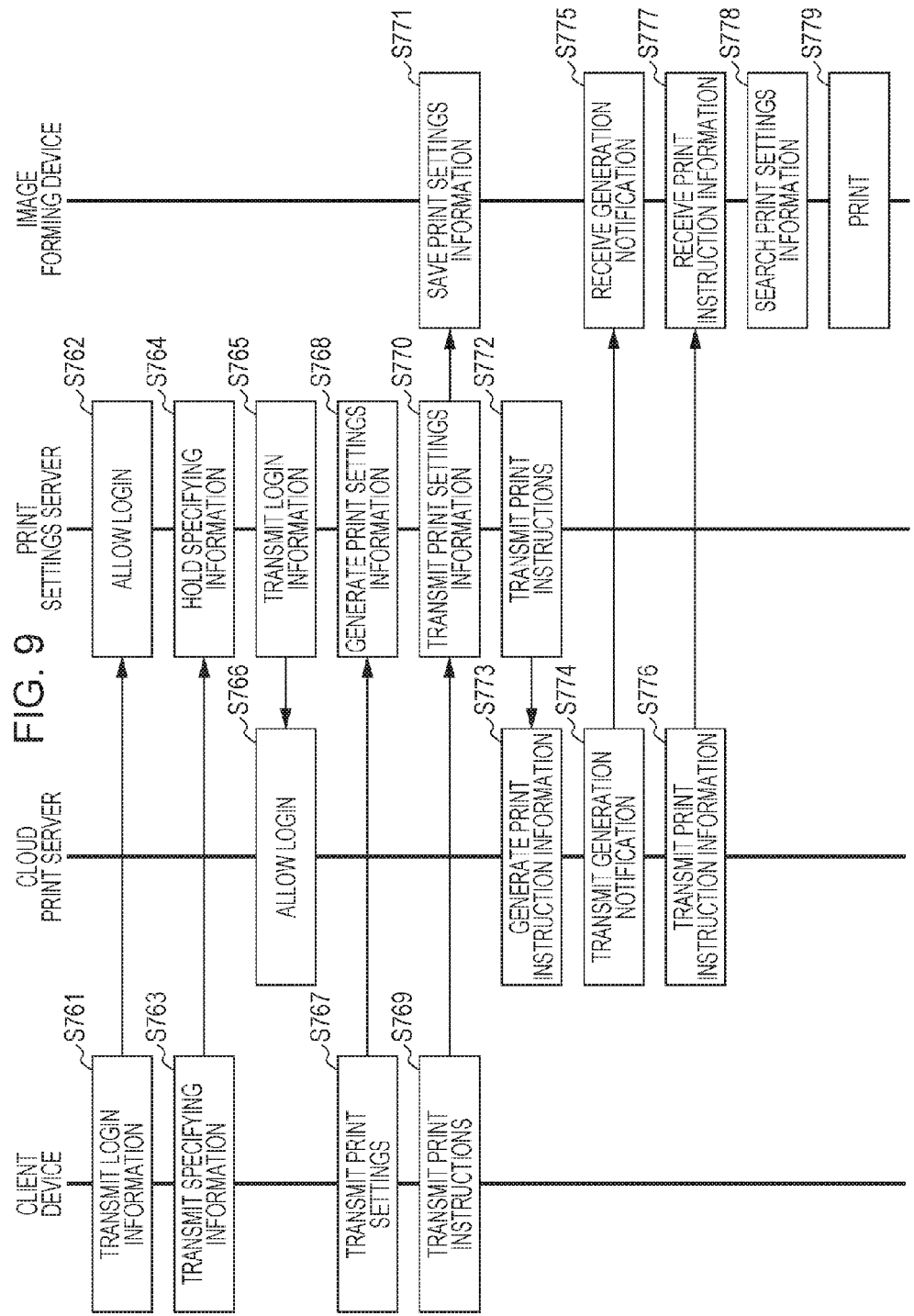
FIG. 9 is a sequence diagram illustrating exemplary operation according to the second exemplary embodiment of the present invention.

FIG. 9 is a sequence diagram illustrating exemplary operation according to the second exemplary embodiment.

First, a client device 20 such as mobile equipment, following instructions from a user, accesses a print settings service and logs into the print settings service with a preregistered user ID. Specifically, on the client device 20, the transmitting unit 21 transmits login information such as a user ID to the print settings server 40 (step S761). Subsequently, on the print settings server 40, the receiving unit 42 receives the login information, the authenticating unit 43 conducts authentication on the basis thereof, and allows login if authentication succeeds (step S762). Note that, although not illustrated in the drawings, information about whether or not login is allowed is passed from the authenticating unit 43 to the transmitting unit 41, and sent in reply from the transmitting unit 41 to the client device 20.

After that, the client device 20 specifies a cloud print service to use for printing by Uniform Resource Locator (URL) or the like. Specifically, on the client device 20, the transmitting unit 21 transmits specifying information such as a URL to the print settings server 40 (step S763). Subsequently, on the print settings server 40, the receiving unit 42 receives the specifying information, and the holding unit 44 holds the specifying information (step S764).

In addition, the print settings server 40 logs into the cloud print service on behalf of the client device 20. Specifically, on the print settings server 40, the transmitting unit 41 transmits login information such as a user ID to the cloud print server 30 specified by the specifying information held by the holding unit 44 (step S765). Subsequently, on the cloud print server 30, the receiving unit 32 receives the login information, the authenticating unit 33 conducts authentication on the basis thereof, and allows login if authentication succeeds (step S766). Note that, although not illustrated in the drawings, information about whether or not login is allowed is passed from the authenticating unit 33 to the transmitting unit 31, and sent in reply from the transmitting unit 31 to the print settings server 40. Also, at this point, the print settings server 40 acquires from the cloud print server 30 a document list, which is a list of documents that a user may print. Subsequently, the acquired document list is included in a UI screen provided by the print settings service (a webpage, for example), and displayed on the client device 20.

Consequently, the client device 20 selects a user-specified document from the displayed document list, displays a print settings screen and configures print settings, and the print settings server 40 generates print settings information indicating the print settings. Specifically, on the client device 20, the transmitting unit 21 transmits print settings to the print settings server 40 (step S767). Subsequently, on the print settings server 40, the receiving unit 42 receives the print settings, and the generating unit 45 generates print settings information (step S768).

After that, the client device 20 gives instructions to print the user-specified document on the image forming device 10. Subsequently, the print settings server 40 transmits the print settings information, including the user ID of the user using the client device 20, to the image forming device 10. Specifically, on the client device 20, the transmitting unit 21 transmits print instructions to print a document on the image forming device 10 to the print settings server 40 (step S769). Subsequently, on the print settings server 40, the receiving unit 42 receives the print instructions, and the transmitting unit 41 transmits the print settings information generated in step S768 to the image forming device 10 (step S770).

Next, the print settings server 40 transmits print instructions to print the user-specified document to the cloud print service. Specifically, on the print settings server 40, the transmitting unit 41 transmits print instructions to print a document on the image forming device 10 to the cloud print server 30 (step S772). Note that since the process from steps S773 to S779 after the cloud print server 30 receives the print instructions is the same as the process from steps S713 to S719 of FIG. 6, description thereof will be reduced or omitted.

Third Exemplary Embodiment

Since an overall configuration according to the third exemplary embodiment of the present invention is the same as that exemplified in FIG. 1, description thereof will be reduced or omitted. Also, since the hardware configuration of an image forming device 10 according to the present exemplary embodiment is likewise the same as that exemplified in FIG. 2, description thereof will be reduced or omitted. Furthermore, the hardware configuration of a client device 20 and server devices 30 and 40 according to the present exemplary embodiment is likewise the same as that exemplified in FIG. 3, or deducible from that exemplified in FIG. 3, description thereof will be reduced or omitted.

Meanwhile, in the present exemplary embodiment, the cloud print server 30 is still used as the server device 30 in FIG. 1, and the print settings server 40 is still used as the server device 40 in FIG. 1. The cloud print server 30 and the print settings server 40 are the same as those discussed in the first exemplary embodiment, except for the following points. Namely, in the present exemplary embodiment, a user has a user ID for logging into each of multiple cloud print services, and is able to manage and print documents on the image forming device 10 using each of the multiple cloud print services. In addition, the user is assumed to also have a user ID for logging into a print settings service. Furthermore, assume that the user has registered an ID of a cloud print service that the user is able to use (hereinafter designated a "service ID") in association with a user ID for logging into that cloud print service.

Since a functional configuration of the image forming device 10, the client device 20, the cloud print server 30, and the print settings server 40 according to the present exemplary embodiment is the same as that exemplified in FIG. 4, the description will once again refer to FIG. 4.

As illustrated in FIG. 4, the image forming device 10 is equipped with a transmitting unit 11, a receiving unit 12, a determining unit 13, a saving unit 14, a searching unit 15, and an outputting unit 16. The transmitting unit 11 transmits polling data querying the existence of print instruction information to the cloud print server 30. The receiving unit 12 receives a generation notification reporting that print instruction information has been generated as well as print instruction information, including a user ID, from the cloud print server 30, and receives print settings information, including a user ID, from the print settings server 40. The determining unit 13 determines the type of data received by the receiving unit 12. In the case in which the determining unit 13 determines that the data is print settings information, the saving unit 14 saves the print settings information in the storage unit 105 (see FIG. 2). In the case in which the determining unit 13 determines that the data is print instruction information, the searching unit 15 searches the storage unit 105 for print settings information that includes the same service ID and user ID as the service ID and user ID included in the print instruction information. The outputting unit 16 outputs print data, including the print instruction information received by the receiving unit 12 and the print settings information found by the searching unit 15, to the image forming unit 109 (see FIG. 2) via the image processing unit 111 (see FIG. 2). In the present exemplary embodiment, the image forming device 10 is provided as an example of a printer. Also, the receiving unit 12 is provided as an example of a first receiver and a second receiver, the searching unit 15 is provided as an example of a specifying unit, and the image forming unit 109 is provided as an example of a printing unit.

The client device 20 is equipped with a transmitting unit 21 and a receiving unit 22. The transmitting unit 21 transmits login information relevant to logging in to the cloud print service and the print settings service, and in addition, transmits print settings for printing by the cloud print service to the cloud print server 30 and the print settings server 40, and transmits print instructions giving instructions to print using the cloud print service to the cloud print server 30. The receiving unit 22 receives responses to the information transmitted by the transmitting unit 21 from the cloud print server 30 and the print settings server 40. In the present exemplary embodiment, the client device 20 is provided as an example of a print instructing device.

The cloud print server 30 is equipped with a transmitting unit 31, a receiving unit 32, an authenticating unit 33, a holding unit 34, and a generating unit 35. The transmitting unit 31 transmits a generation notification reporting that print instruction information has been generated as well as print instruction information, including a user ID, to the image forming device 10. The receiving unit 32 receives login information relevant to logging into the cloud print service, print settings available on the cloud print service for printing by the cloud print service, and print instructions giving instructions to print using the cloud print service from the client device 20, and receives polling data querying the existence of print instruction information from the image forming device 10. The authenticating unit 33 conducts authentication on the basis of the login information received by the receiving unit 32. The holding unit 34 holds print settings received by the receiving unit 32. The generating unit 35 generates and holds print instruction information on the basis of print instructions received by the receiving unit 32. In the present exemplary embodiment, the cloud print server 30 is provided as an example of a print instruction information holding device. Also, the receiving unit 32 is provided as an example of a receiver, and the generating unit 35 is provided as an example of a holding unit.

The print settings server 40 is equipped with a transmitting unit 41, a receiving unit 42, an authenticating unit 43, and a generating unit 45. The transmitting unit 41 transmits print settings information, including a user ID, to the image forming device 10. The receiving unit 42 receives login information relevant to logging into the print settings service and print settings unavailable on the cloud print service for printing by the cloud print service from the client device 20. The authenticating unit 43 conducts authentication on the basis of login information received by the receiving unit 42. The generating unit 45 generates and holds print settings information on the basis of print settings received by the receiving unit 42. In the present exemplary embodiment, the print settings server 40 is provided as an example of a print settings information holding device.

FIG. 10 is a diagram exemplifying information held by the print settings server 40. Among the information held by the print settings server 40, first, there is print settings information generated by the generating unit 45. In FIG. 10, the value "staple-top-left" is specified for the parameter "finishings", and the value "reverse-portrait" is specified for the parameter "orientation-requested", as the print settings information. The former indicates stapling at the top-left as a finishing process, while the latter indicates that the print orientation is set to portrait in a reverse orientation. Also, among the information held by the print settings server 40, there is information to be included in the print settings information and transmitted to the image forming device 10. In FIG. 10, values such as "http://cloud-a/print" and "http://cloud-b/print" are specified for the parameter "print-service-url", and values such as "user1_cloudA" and "user1_cloudB" are specified for the parameter "service-account" as such information. This information indicates that "http://cloud-a/print", "http://cloud-b/print", and the like are the URLs of cloud print services usable by the user who gave instructions to generate the print settings information, and that "user1_cloudA", "user1_cloudB", and the like are the respective user IDs for logging into these cloud print services.

Figure 11:
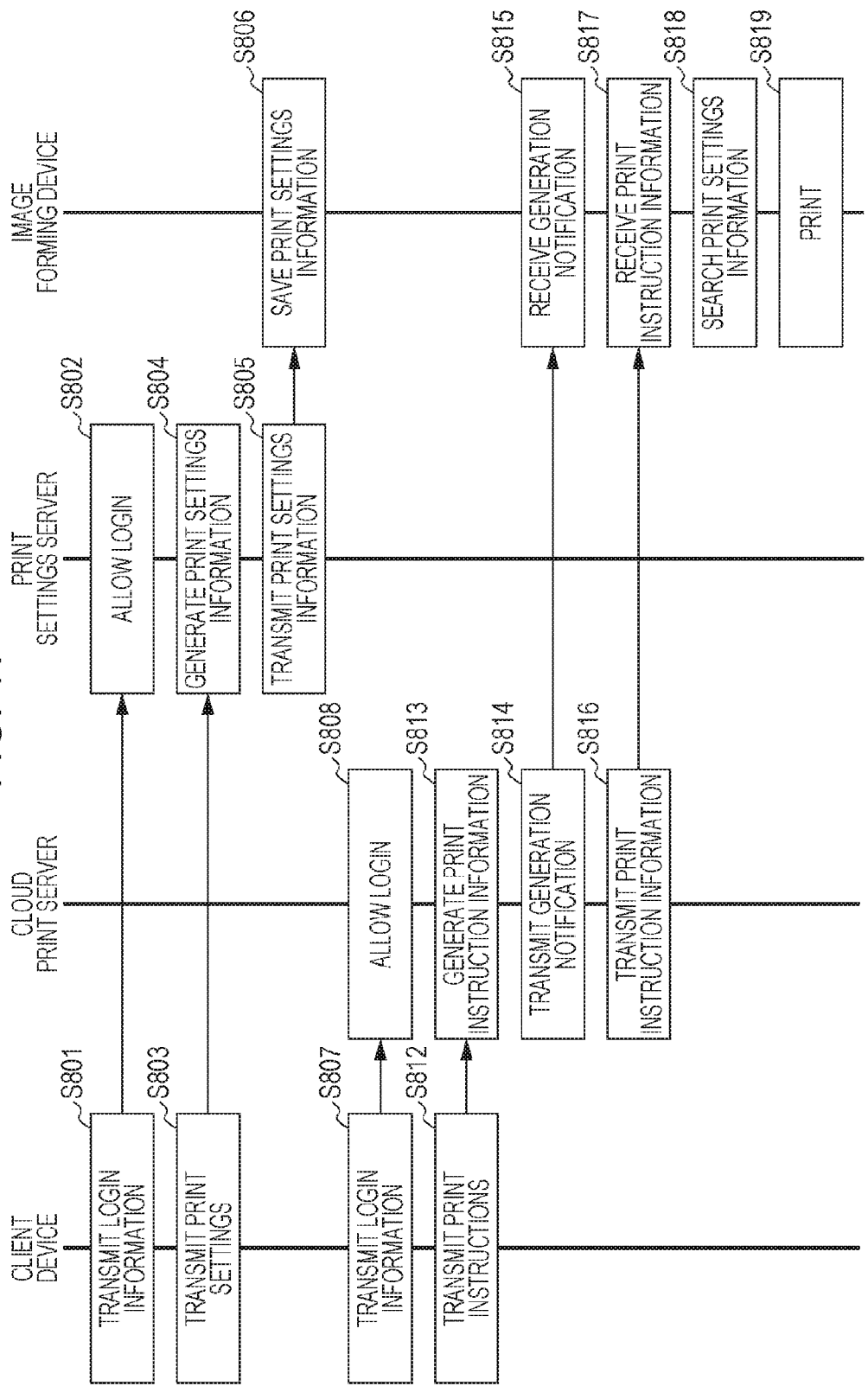
FIG. 11 is a sequence diagram illustrating exemplary operation according to the third exemplary embodiment of the present invention.

FIG. 11 is a sequence diagram illustrating exemplary operation according to the third exemplary embodiment.

First, a client device 20 such as mobile equipment, following instructions from a user, accesses a print settings service and logs into the print settings service with a preregistered user ID. Specifically, on the client device 20, the transmitting unit 21 transmits login information such as a user ID to the print settings server 40 (step S801). Subsequently, on the print settings server 40, the receiving unit 42 receives the login information, the authenticating unit 43 conducts authentication on the basis thereof, and allows login if authentication succeeds (step S802). Note that, although not illustrated in the drawings, information about whether or not login is allowed is passed from the authenticating unit 43 to the transmitting unit 41, and sent in reply from the transmitting unit 41 to the client device 20.

After that, the client device 20 configures print settings using the print settings service for printing by the cloud print service. In addition, the image forming device 10 to conduct the printing is also specified. Specifically, on the client device 20, the transmitting unit 21 transmits print settings, including information indicating the image forming device 10 to conduct the printing, to the print settings server 40 (step S803).

Next, the print settings server 40 generates print settings information indicating the print settings, and transmits the print settings information, including a list of service IDs and a list of user IDs associated therewith, to the specified image forming device 10. Specifically, on the print settings server 40, the generating unit 45 generates print settings information (step S804), and the transmitting unit 41 transmits the print settings information, including service IDs and user IDs, to the specified image forming device 10 (step S805). Note that although the print settings information may be transmitting using any protocol, herein it is assumed that the print settings information is transmitting using the print protocol used to transmit the print instruction information. In addition, the print settings information to generate may be used in common for all cloud print services, or used with one or multiple cloud print services from among multiple registered cloud print services. In this case, combinations of a relevant service ID and a user ID are included in the respective print settings information.

As a result, the image forming device 10 receives data, and upon determining that the data is print settings information, saves the print settings information in a storage unit 105 such as an internal HDD (see FIG. 2). Specifically, on the image forming device 10, the receiving unit 12 receives data, the determining unit 13 determines whether or not the data is print settings information, and if the data is determined to be print settings information, the saving unit 14 saves the print settings information in the storage unit 105 (step S806).

In addition, the client device 20 also logs into a cloud print service with a preregistered user ID.

Specifically, on the client device 20, the transmitting unit 21 transmits login information such as a user ID to the cloud print server 30 (step S807). Subsequently, on the cloud print server 30, the receiving unit 32 receives the login information, the authenticating unit 33 conducts authentication on the basis thereof, and allows login if authentication succeeds (step S808). Note that, although not illustrated in the drawings, information about whether or not login is allowed is passed from the authenticating unit 33 to the transmitting unit 31, and sent in reply from the transmitting unit 31 to the client device 20.

After that, the client device 20 gives instructions to print a document stored in the cloud print service on the same image forming device 10. Specifically, on the client device 20, the transmitting unit 21 transmits print instructions to print a document on the image forming device 10 specified in step S803 to the cloud print server 30 (step S812). Subsequently, on the cloud print server 30, the receiving unit 32 receives the print instructions, and the generating unit 35 generates print instruction information on the basis of the print instructions (step S813).

As a result, the cloud print server 30 notifies the image forming device 10 that print instruction information has been generated, and the image forming device 10 receives this notification and acquires print instruction information from the cloud print server 30. Specifically, on the cloud print server 30, the transmitting unit 31 transmits a generation notification reporting that print instruction information has been generated to the image forming device 10 (step S814). Subsequently, on the image forming device 10, the receiving unit 12 receives the generation notification (step S815), and although not illustrated in the drawings, the transmitting unit 11 polls the cloud print server 30. As a result, on the cloud print server 30, the transmitting unit 31 transmits print instruction information, including a user ID, to the image forming device 10 (step S816). Subsequently, on the image forming device 10, the receiving unit 12 receives the print instruction information (step S817). Note that in this case, since the determining unit 13 determines that the received data is print instruction information, the print instruction information is passed to the searching unit 15.

Next, the image forming device 10 extracts the service ID and user ID from the acquired print instruction information, and searches the storage unit 105 for print settings information having the same combination of service ID and user ID. Specifically, the searching unit 15 searches user IDs included in print settings information stored in the storage unit 105 for the user ID included in the print instruction information passed from the determining unit 13 (step S818).

As a result, if print settings information having the service ID and user ID extracted from the print instruction information is found, the image forming device 10 conducts various printing using the print settings indicated by the print settings information. Specifically, the outputting unit 16 outputs print data, including the print instruction information received in step S817 and the print settings information found in step S818, to the image forming unit 109 (see FIG. 2) via the image processing unit 111 (see FIG. 2) (step S819). Consequently, in the image forming unit 109, a document image included in the print instruction information is printed using the print settings information.

Note that although this exemplary operation is configured to transmit print settings information to the image forming device 10 in advance, and subsequently print using a cloud print service, print settings information may also be generated using a print settings service every time print instructions are transmitted. The sequence in this case follows the sequence according to the first exemplary embodiment and the second exemplary embodiment.

Fourth Exemplary Embodiment

Figure 12:
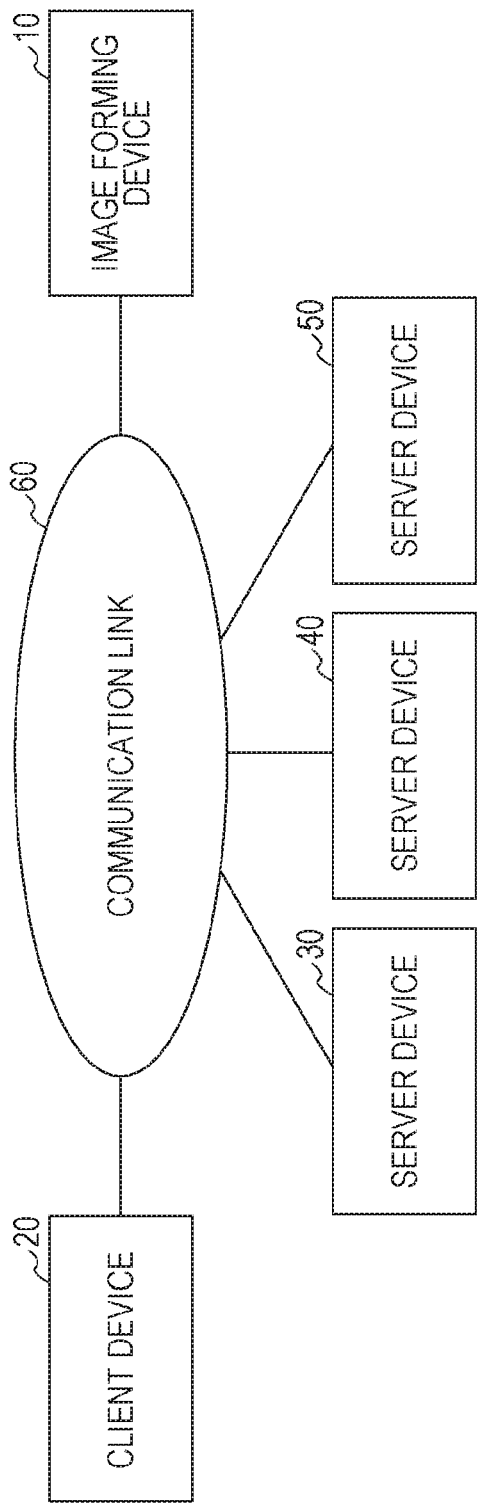
FIG. 12 is a diagram exemplifying an overall configuration according to the fourth exemplary embodiment of the present invention.

FIG. 12 is a diagram exemplifying an overall configuration according to the fourth exemplary embodiment of the present invention. An image forming device 10 is equipped with a document copying function, a function of scanning a document and generating scanned document image data, and a function of forming an image expressed by image data onto a sheet. A client device 20 receives information input by a user, and outputs information to the user. Server devices 30, 40, and 50 receive a request from the client device 20 and provide a service. The respective devices are connected to a communication link 60 that communicably connects devices to each other, and are capable of communicating with each other via the communication link 60. Note that although FIG. 12 illustrates one image forming device, one client device, and three server devices, two or more image forming devices or client devices, and four or more server devices may also be connected to the communication link 60.

Since the hardware configuration of an image forming device 10 according to the present exemplary embodiment is the same as that exemplified in FIG. 2, description thereof will be reduced or omitted. Also, the hardware configuration of a client device 20 and server devices 30 and 40 according to the present exemplary embodiment is likewise the same as that exemplified in FIG. 3, or deducible from that exemplified in FIG. 3, description thereof will be reduced or omitted. Furthermore, FIG. 3 may also be interpreted as a block diagram exemplifying a hardware configuration of the server device 50. In this case, the CPU 201, the main memory 202, the HDD 203, the communication I/F 204, the display mechanism 205, and the input device 206 will be respectively designated the CPU 501, the main memory 502, the HDD 503, the communication I/F 504, the display mechanism 505, and the input device 506.

Meanwhile, in the present exemplary embodiment, the cloud print server 30 is still used as the server device 30 in FIG. 12, and the print settings server 40 is still used as the server device 40 in FIG. 12. The cloud print server 30 and the print settings server 40 are the same as those discussed in the first exemplary embodiment, except for the following points. Namely, in the present exemplary embodiment, a user has a user ID for logging into each of multiple cloud print services, and is able to manage and print documents on the image forming device 10 using each of the multiple cloud print services. In addition, the user is assumed to also have a user ID for logging into a print settings service. Furthermore, assume that the user has registered an ID of a cloud print service that the user is able to use (a service ID) in association with a user ID for logging into that cloud print service.

In addition, in the present exemplary embodiment, a cloud service bridge 50 is used as the server device 50 in FIG. 12. The cloud service bridge 50 is able to connect to multiple cloud print servers 30, and is able to receive print instruction information from each cloud print server 30.

In addition, the image forming device 10 is configured to be able to connect to a communication link 60 such as the Internet, and connecting to the cloud service bridge 50 is also possible.

Figure 13:
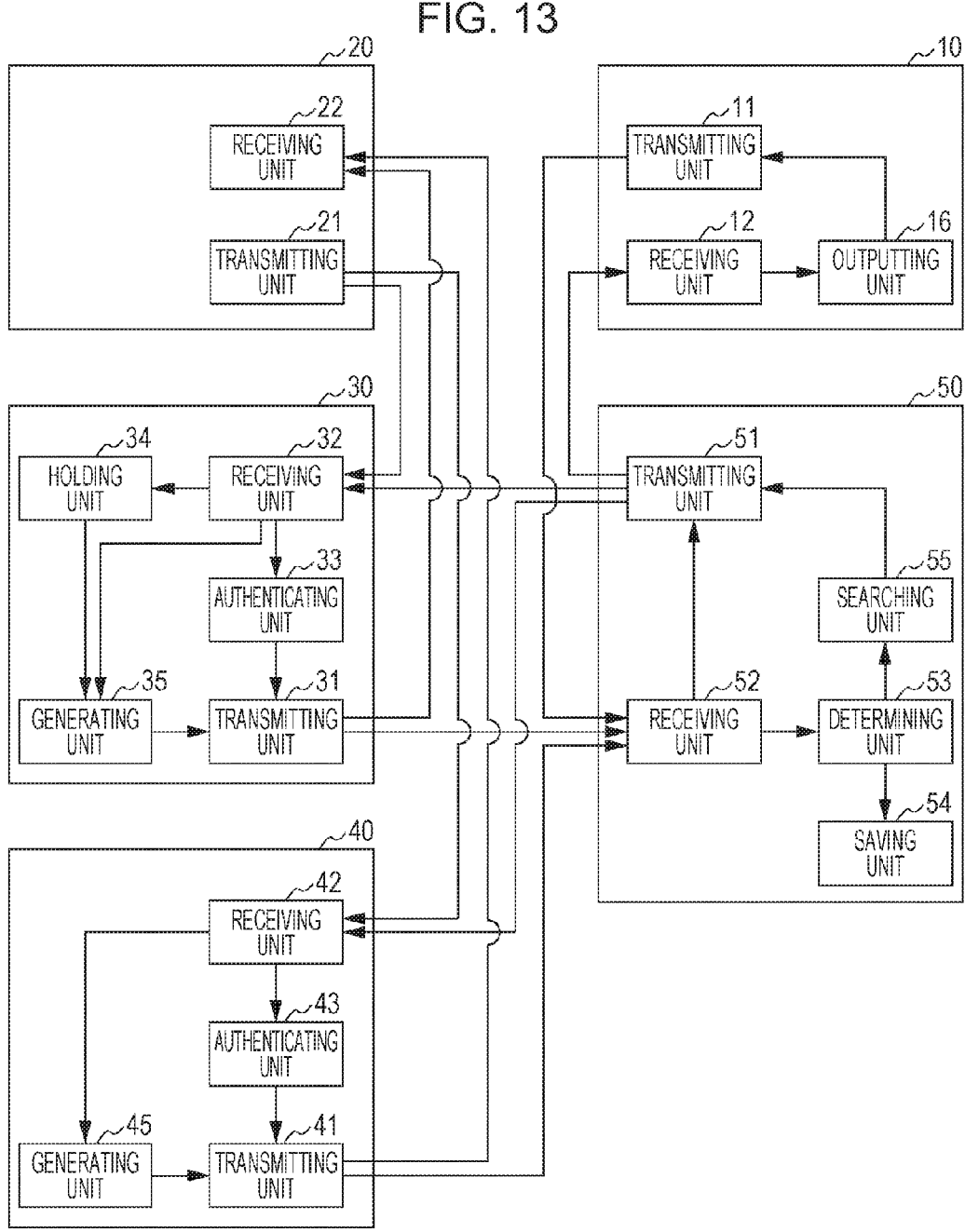
FIG. 13 is a block diagram exemplifying a functional configuration of respective devices according to the fourth exemplary embodiment of the present invention.

FIG. 13 is a block diagram exemplifying a functional configuration of the image forming device 10, the client device 20, the cloud print server 30, the print settings server 40, and the cloud service bridge 50 according to the present exemplary embodiment.

As illustrated in FIG. 13, the image forming device 10 is equipped with a transmitting unit 11, a receiving unit 12, and an outputting unit 16. The transmitting unit 11 transmits various information related to printing to the cloud service bridge 50. The receiving unit 12 receives print data, including print instruction information and print settings information, from the cloud service bridge 50. The outputting unit 16 outputs print data received by the receiving unit 12 to the image forming unit 109 (see FIG. 2) via the image processing unit 111 (see FIG. 2). In the present exemplary embodiment, the image forming device 10 is provided as an example of a printer.

The client device 20 is equipped with a transmitting unit 21 and a receiving unit 22. The transmitting unit 21 transmits login information relevant to logging in to the cloud print service and the print settings service, and in addition, transmits print settings for printing by the cloud print service to the cloud print server 30 and the print settings server 40, and transmits print instructions giving instructions to print using the cloud print service to the cloud print server 30. The receiving unit 22 receives responses to the information transmitted by the transmitting unit 21 from the cloud print server 30 and the print settings server 40.

The cloud print server 30 is equipped with a transmitting unit 31, a receiving unit 32, an authenticating unit 33, a holding unit 34, and a generating unit 35. The transmitting unit 31 transmits a generation notification reporting that print instruction information has been generated as well as print instruction information, including a user ID, to the cloud service bridge 50. The receiving unit 32 receives login information relevant to logging into the cloud print service, print settings available on the cloud print service for printing by the cloud print service, and print instructions giving instructions to print using the cloud print service from the client device 20, and receives polling data querying the existence of print instruction information from the cloud service bridge 50. The authenticating unit 33 conducts authentication on the basis of the login information received by the receiving unit 32. The holding unit 34 holds print settings received by the receiving unit 32. The generating unit 35 generates and holds print instruction information on the basis of print instructions received by the receiving unit 32. In the present exemplary embodiment, the cloud print server 30 is provided as an example of a print instruction information holding device.

The print settings server 40 is equipped with a transmitting unit 41, a receiving unit 42, an authenticating unit 43, and a generating unit 45. The transmitting unit 41 transmits print settings information, including a user ID, to the cloud service bridge 50. The receiving unit 42 receives login information relevant to logging into the print settings service and print settings unavailable on the cloud print service for printing by the cloud print service from the client device 20. The authenticating unit 43 conducts authentication on the basis of login information received by the receiving unit 42. The generating unit 45 generates and holds print settings information on the basis of print settings received by the receiving unit 42. In the present exemplary embodiment, the print settings server 40 is provided as an example of a print settings information holding device.

The cloud service bridge 50 is equipped with a transmitting unit 51, a receiving unit 52, a determining unit 53, a saving unit 54, and a searching unit 55. The transmitting unit 51 transmits polling data querying the existence of print instruction information to the cloud print server 30, and transmits print data, including print instruction information received by the receiving unit 52 and print settings information found by the searching unit 55, to the image forming device 10. The receiving unit 52 receives a generation notification reporting that print instruction information has been generated as well as print instruction information, including a user ID, from the cloud print server 30, and receives print settings information, including a user ID, from the print settings server 40. The determining unit 53 determines the type of data received by the receiving unit 52. In the case in which the determining unit 53 determines that the data is print settings information, the saving unit 54 saves the print settings information in the HDD 503. In the case in which the determining unit 53 determines that the data is print instruction information, the searching unit 55 searches the HDD 503 for print settings information that includes the same service ID and user ID as the service ID and user ID included in the print instruction information. In the present exemplary embodiment, the cloud service bridge 50 is provided as an example of a print control device. Also, the transmitting unit 51 is provided as an example of a transmitter, the receiving unit 52 is provided as an example of a receiver and an acquiring unit, and the searching unit 55 is provided as an example of a specifying unit.

Note that since the information held by the print settings server 40 is the same as that exemplified in FIG. 10, description herein will be reduced or omitted.

Figure 14:
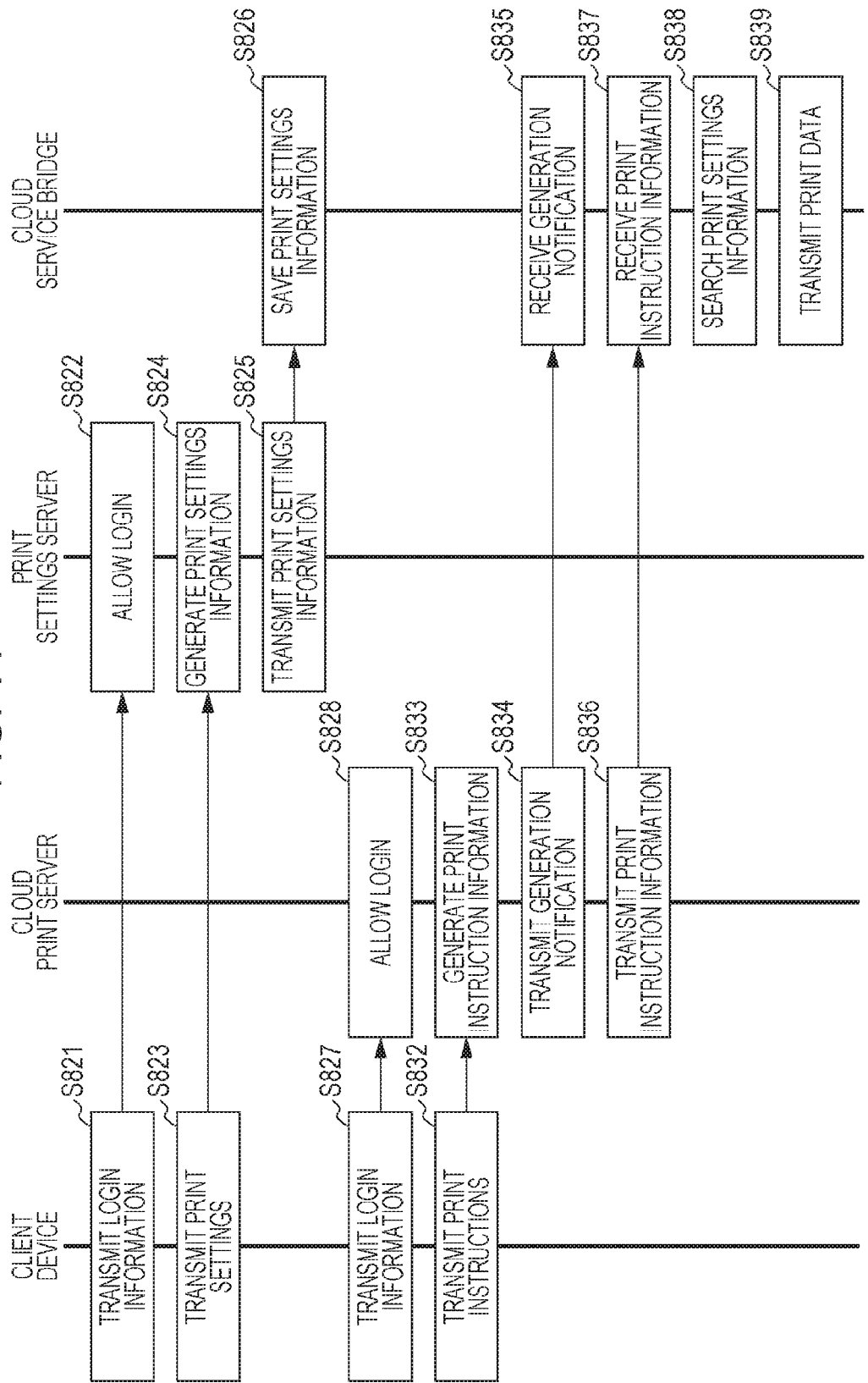
FIG. 14 is a sequence diagram illustrating exemplary operation according to the fourth exemplary embodiment of the present invention.

FIG. 14 is a sequence diagram illustrating exemplary operation according to the fourth exemplary embodiment.

First, a client device 20 such as mobile equipment, following instructions from a user, accesses a print settings service and logs into the print settings service with a preregistered user ID. Specifically, on the client device 20, the transmitting unit 21 transmits login information such as a user ID to the print settings server 40 (step S821). Subsequently, on the print settings server 40, the receiving unit 42 receives the login information, the authenticating unit 43 conducts authentication on the basis thereof, and allows login if authentication succeeds (step S822). Note that, although not illustrated in the drawings, information about whether or not login is allowed is passed from the authenticating unit 43 to the transmitting unit 41, and sent in reply from the transmitting unit 41 to the client device 20.

After that, the client device 20 configures print settings using the print settings service for printing by the cloud print service. In addition, the image forming device 10 to conduct the printing is also specified. Specifically, on the client device 20, the transmitting unit 21 transmits print settings, including information indicating the image forming device 10 to conduct the printing, to the print settings server 40 (step S823).

Next, the print settings server 40 generates print settings information indicating the print settings, and transmits the print settings information, including a list of service IDs and a list of user IDs associated therewith, to the cloud service bridge 50. Specifically, on the print settings server 40, the generating unit 45 generates print settings information (step S824), and the transmitting unit 41 transmits the print settings information, including service IDs and user IDs, to the cloud service bridge 50 (step S825). Note that although the print settings information may be transmitting using any protocol, herein it is assumed that the print settings information is transmitting using the print protocol used to transmit the print instruction information. Also, the print settings information to be generated is the same as that discussed in the third exemplary embodiment.

As a result, the cloud service bridge 50 receives data, and upon determining that the data is print settings information, saves the print settings information in an internal HDD 503. Specifically, on the cloud service bridge 50, the receiving unit 52 receives data, the determining unit 53 determines whether or not the data is print settings information, and if the data is determined to be print settings information, the saving unit 54 saves the print settings information in the HDD 503 (step S826).

In addition, the client device 20 also logs into a cloud print service with a preregistered user ID. Specifically, on the client device 20, the transmitting unit 21 transmits login information such as a user ID to the cloud print server 30 (step S827). Subsequently, on the cloud print server 30, the receiving unit 32 receives the login information, the authenticating unit 33 conducts authentication on the basis thereof, and allows login if authentication succeeds (step S828). Note that, although not illustrated in the drawings, information about whether or not login is allowed is passed from the authenticating unit 33 to the transmitting unit 31, and sent in reply from the transmitting unit 31 to the client device 20.

After that, the client device 20 gives instructions specifying the image forming device 10 to print a document stored in the cloud print service. Specifically, on the client device 20, the transmitting unit 21 transmits print instructions to print a document on the image forming device 10 to the cloud print server 30 (step S832). Subsequently, on the cloud print server 30, the receiving unit 32 receives the print instructions, and the generating unit 35 generates print instruction information on the basis of the print instructions (step S833).

As a result, the cloud print server 30 notifies the cloud service bridge 50 that print instruction information has been generated, and the cloud service bridge 50 receives this notification and acquires print instruction information from the cloud print server 30. Specifically, on the cloud print server 30, the transmitting unit 31 transmits a generation notification reporting that print instruction information has been generated to the cloud service bridge 50 (step S834). Subsequently, on the cloud service bridge 50, the receiving unit 52 receives the generation notification (step S835), and although not illustrated in the drawings, the transmitting unit 51 polls the cloud print server 30. As a result, on the cloud print server 30, the transmitting unit 31 transmits print instruction information, including a user ID, to the cloud service bridge 50 (step S836). Subsequently, on the cloud service bridge 50, the receiving unit 52 receives the print instruction information (step S837). Note that in this case, since the determining unit 53 determines that the received data is print instruction information, the print instruction information is passed to the searching unit 55.

Next, the cloud service bridge 50 extracts the service ID and user ID from the acquired print instruction information, and searches the HDD 503 for print settings information having the same combination of service ID and user ID. Specifically, the searching unit 55 searches service IDs and user IDs included in print settings information stored in the HDD 503 for the service ID and user ID included in the print instruction information passed from the determining unit 53 (step S838).

As a result, if print settings information having the service ID and user ID extracted from the print instruction information is found, the cloud service bridge 50 merges the print settings information into the print instruction information acquired from the cloud print service, and transmits the merged print instruction information to the specified image forming device 10 for printing.

Specifically, the transmitting unit 51 transmits print data, including the print instruction information received in step S837 and the print settings information found in step S838, to the image forming device 10 (step S839). Subsequently, although not illustrated in FIG. 14, on the image forming device 10, the receiving unit 12 receives the print data, and the outputting unit 16 outputs the print data to the image forming unit 109 (see FIG. 2) via the image processing unit 111 (see FIG. 2). Consequently, in the image forming unit 109, a document image included in the print instruction information is printed using the print settings information.

Note that in this exemplary operation, used print settings information may be deleted, or saved until user instructions are given.

Also, although this exemplary operation is configured to transmit print settings information to the cloud service bridge 50 in advance, and subsequently print using a cloud print service, print settings information may also be generated using a print settings service every time print instructions are transmitted. The sequence in this case follows the sequence according to the first exemplary embodiment and the second exemplary embodiment.

Fifth Exemplary Embodiment

Since an overall configuration according to the fifth exemplary embodiment of the present invention is the same as that exemplified in FIG. 1, description thereof will be reduced or omitted. Also, since the hardware configuration of an image forming device 10 according to the present exemplary embodiment is likewise the same as that exemplified in FIG. 2, description thereof will be reduced or omitted. Furthermore, the hardware configuration of a client device 20 and server devices 30 and 40 according to the present exemplary embodiment is likewise the same as that exemplified in FIG. 3, or deducible from that exemplified in FIG. 3, description thereof will be reduced or omitted.

Meanwhile, in the present exemplary embodiment, the cloud print server 30 is used as the server device 30 in FIG. 1, and the cloud service bridge 50 is used as the server device 40 in FIG. 1. Since the cloud print server 30 has been discussed in the first exemplary embodiment, description herein will be reduced or omitted. Also, the cloud service bridge 50 according to the present exemplary embodiment includes the functionality of the print settings server 40 according to the fourth exemplary embodiment.

Figure 15:
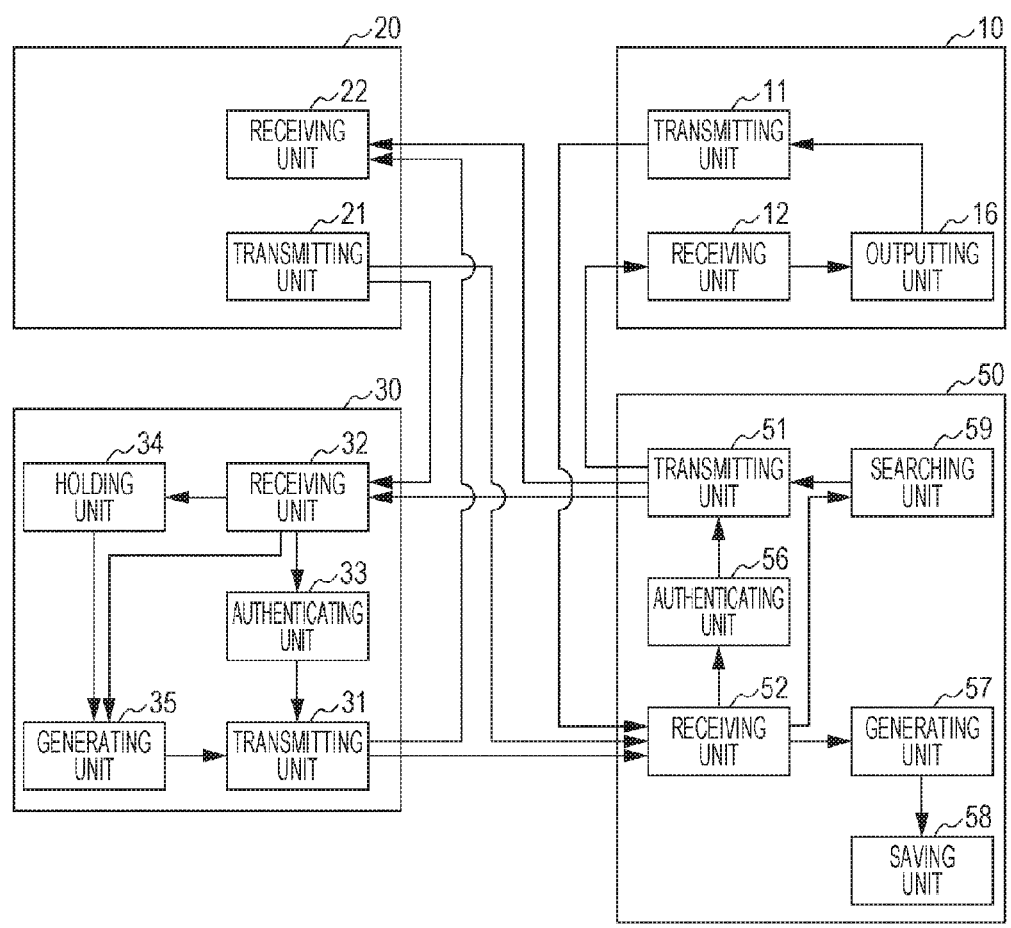
FIG. 15 is a block diagram exemplifying a functional configuration of respective devices according to the fifth exemplary embodiment of the present invention.

FIG. 15 is a block diagram exemplifying a functional configuration of the image forming device 10, the client device 20, the cloud print server 30, and the cloud service bridge 50 according to the present exemplary embodiment.

As illustrated in FIG. 15, the image forming device 10 is equipped with a transmitting unit 11, a receiving unit 12, and an outputting unit 16. The transmitting unit 11 transmits various information related to printing to the cloud service bridge 50. The receiving unit 12 receives print data, including print instruction information and print settings information, from the cloud service bridge 50. The outputting unit 16 outputs print data received by the receiving unit 12 to the image forming unit 109 (see FIG. 2) via the image processing unit 111 (see FIG. 2). In the present exemplary embodiment, the image forming device 10 is provided as an example of a printer.

The client device 20 is equipped with a transmitting unit 21 and a receiving unit 22. The transmitting unit 21 transmits login information relevant to logging in to each cloud print service, and in addition, transmits print settings for printing by the cloud print service to each server device, and transmits print instructions giving instructions to print using the cloud print service to the cloud print server 30. The receiving unit 22 receives responses to the information transmitted by the transmitting unit 21 from each server device.

The cloud print server 30 is equipped with a transmitting unit 31, a receiving unit 32, an authenticating unit 33, a holding unit 34, and a generating unit 35. The transmitting unit 31 transmits a generation notification reporting that print instruction information has been generated as well as print instruction information, including a user ID, to the cloud service bridge 50. The receiving unit 32 receives login information relevant to logging into the cloud print service, print settings available on the cloud print service for printing by the cloud print service, and print instructions giving instructions to print using the cloud print service from the client device 20, and receives polling data querying the existence of print instruction information from the cloud service bridge 50. The authenticating unit 33 conducts authentication on the basis of the login information received by the receiving unit 32. The holding unit 34 holds print settings received by the receiving unit 32. The generating unit 35 generates and holds print instruction information on the basis of print instructions received by the receiving unit 32. In the present exemplary embodiment, the cloud print server 30 is provided as an example of a print instruction information holding device.

The cloud service bridge 50 is equipped with a transmitting unit 51, a receiving unit 52, an authenticating unit 56, a generating unit 57, a saving unit 58, and a searching unit 59. The transmitting unit 51 transmits polling data querying the existence of print instruction information to the cloud print server 30, and transmits print data, including print instruction information received by the receiving unit 52 and print settings information found by the searching unit 59, to the image forming device 10. The receiving unit 52 receives login information relevant to logging into the cloud service bridge 50 and print settings unavailable on the cloud print service for printing by the cloud print service from the client device 20, and receives a generation notification reporting that print instruction information has been generated as well as print instruction information, including a user ID, from the cloud print server 30. The authenticating unit 56 conducts authentication on the basis of login information received by the receiving unit 52. The generating unit 57 generates print settings information, including a user ID, on the basis of print settings received by the receiving unit 52. The saving unit 58 saves print settings information generated by the generating unit 57 in the HDD 503. The searching unit 59 searches the HDD 503 for print settings information that includes the same service ID and user ID as the service ID and user ID included in the print instruction information received by the receiving unit 52. In the present exemplary embodiment, the cloud service bridge 50 is provided as an example of a print settings information holding device and a print control device. Also, the transmitting unit 51 is provided as an example of a transmitter, the receiving unit 52 is provided as an example of a receiver and an acquiring unit, and the searching unit 59 is provided as an example of a specifying unit.

Note that since the information held by the cloud service bridge 50 is the same as that exemplified in FIG. 10, description herein will be reduced or omitted.

Figure 16:
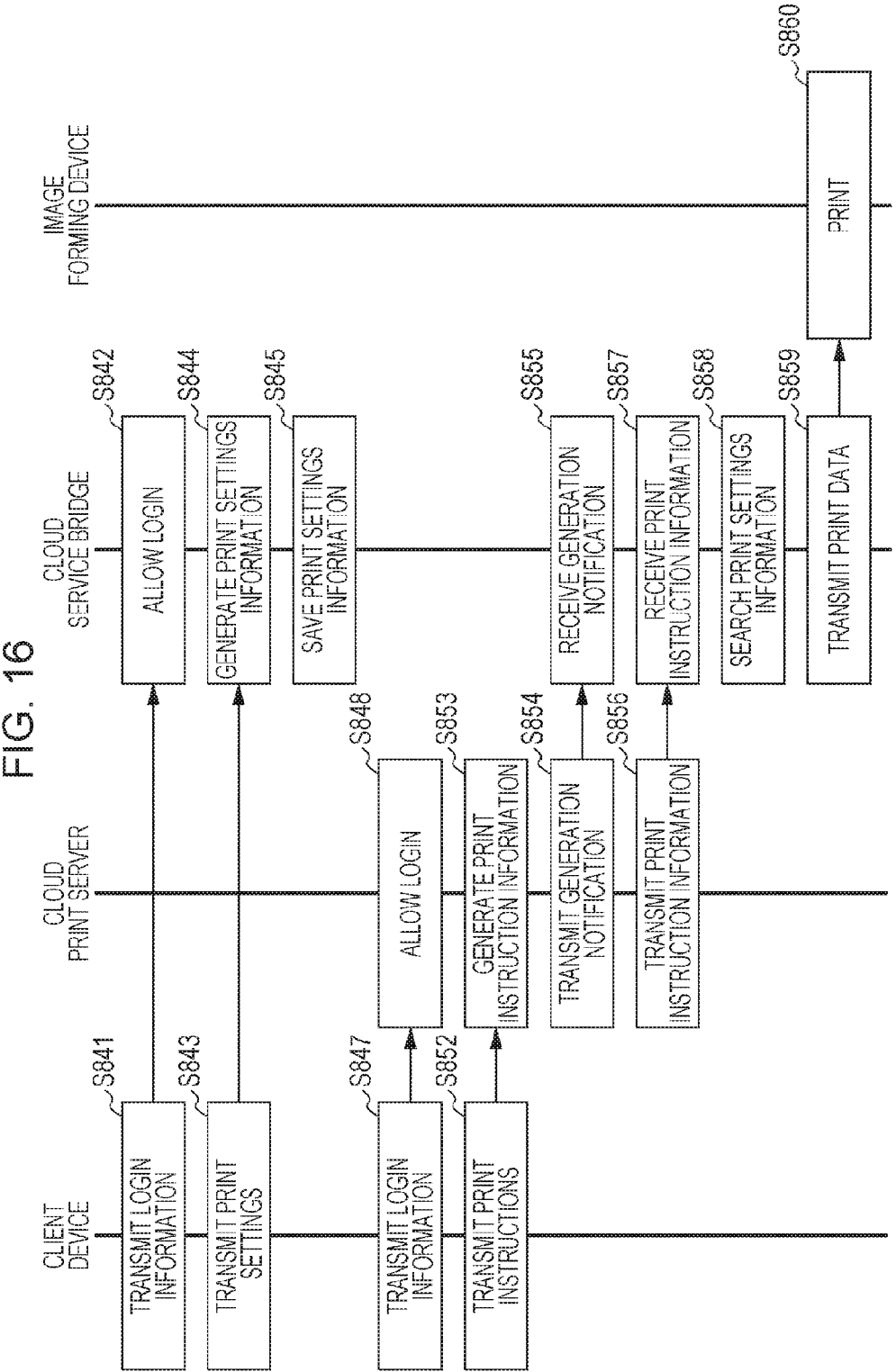
FIG. 16 is a sequence diagram illustrating exemplary operation according to the fifth exemplary embodiment of the present invention.

FIG. 16 is a sequence diagram illustrating exemplary operation according to the fifth exemplary embodiment.

First, a client device 20 such as mobile equipment, following instructions from a user, accesses the cloud service bridge 50 and logs in with a preregistered user ID. Specifically, on the client device 20, the transmitting unit 21 transmits login information such as a user ID to the cloud service bridge 50 (step S841). Subsequently, on the cloud service bridge 50, the receiving unit 52 receives the login information, the authenticating unit 56 conducts authentication on the basis thereof, and allows login if authentication succeeds (step S842). Note that, although not illustrated in the drawings, information about whether or not login is allowed is passed from the authenticating unit 56 to the transmitting unit 51, and sent in reply from the transmitting unit 51 to the client device 20.

After that, the client device 20 configures print settings using the print settings service on the cloud service bridge 50 for printing by the cloud print service. In addition, the image forming device 10 to conduct the printing is also specified. Specifically, on the client device 20, the transmitting unit 21 transmits print settings, including information indicating the image forming device 10 to conduct the printing, to the cloud service bridge 50 (step S843).

Next, the cloud service bridge 50 generates print settings information indicating the print settings, and saves the print settings information, including a list of service IDs and a list of user IDs associated therewith, in an internal HDD 503. Specifically, on the cloud service bridge 50, the generating unit 57 generates print settings information (step S844), and the saving unit 58 saves the print settings information in the HDD 503 (step S845).

In addition, the client device 20 also logs into a cloud print service with a preregistered user ID.

Specifically, on the client device 20, the transmitting unit 21 transmits login information such as a user ID to the cloud print server 30 (step S847). Subsequently, on the cloud print server 30, the receiving unit 32 receives the login information, the authenticating unit 33 conducts authentication on the basis thereof, and allows login if authentication succeeds (step S848). Note that, although not illustrated in the drawings, information about whether or not login is allowed is passed from the authenticating unit 33 to the transmitting unit 31, and sent in reply from the transmitting unit 31 to the client device 20.

After that, the client device 20 gives instructions specifying the image forming device 10 to print a document stored in the cloud print service. Specifically, on the client device 20, the transmitting unit 21 transmits print instructions to print a document on the image forming device 10 to the cloud print server 30 (step S852). Subsequently, on the cloud print server 30, the receiving unit 32 receives the print instructions, and the generating unit 35 generates print instruction information on the basis of the print instructions (step S853).

As a result, the cloud print server 30 notifies the cloud service bridge 50 that print instruction information has been generated, and the cloud service bridge 50 receives this notification and acquires print instruction information from the cloud print server 30. Specifically, on the cloud print server 30, the transmitting unit 31 transmits a generation notification reporting that print instruction information has been generated to the cloud service bridge 50 (step S854). Subsequently, on the cloud service bridge 50, the receiving unit 52 receives the generation notification (step S855), and although not illustrated in the drawings, the transmitting unit 51 polls the cloud print server 30. As a result, on the cloud print server 30, the transmitting unit 31 transmits print instruction information, including a user ID, to the cloud service bridge 50 (step S856). Subsequently, on the cloud service bridge 50, the receiving unit 52 receives the print instruction information (step S857). Note that this print instruction information is passed to the searching unit 59.

Next, the cloud service bridge 50 extracts the service ID and user ID from the acquired print instruction information, and searches the HDD 503 for print settings information having the same combination of service ID and user ID. Specifically, the searching unit 59 searches service IDs and user IDs included in print settings information stored in the HDD 503 for the service ID and user ID included in the print instruction information passed from the receiving unit 52 (step S858).

As a result, if print settings information having the service ID and user ID extracted from the print instruction information is found, the cloud service bridge 50 merges the print settings information into the print instruction information acquired from the cloud print service, and transmits the merged print instruction information to the specified image forming device 10 for printing.

Specifically, the transmitting unit 51 transmits print data, including the print instruction information received in step S857 and the print settings information found in step S858, to the image forming device 10 (step S859). Subsequently, on the image forming device 10, the receiving unit 12 receives the print data, and the outputting unit 16 outputs the print data to the image forming unit 109 (see FIG. 2) via the image processing unit 111 (see FIG. 2) (step S860). Consequently, in the image forming unit 109, a document image included in the print instruction information is printed using the print settings information.

Note that in this exemplary operation, used print settings information may be deleted, or saved until user instructions are given.

Also, although this exemplary operation is configured to transmit print settings information to the cloud service bridge 50 in advance, and subsequently print using a cloud print service, print settings information may also be generated using a print settings service every time print instructions are transmitted. The sequence in this case follows the sequence according to the first exemplary embodiment and the second exemplary embodiment.

The foregoing thus describes the first to fifth exemplary embodiments of the present invention. Note that in these exemplary embodiments, although a user ID is used as an identifier for associating print instruction information with print settings information, the configuration is not limited thereto, and an arbitrary number may also be used as an identifier. In this case, an arbitrary number may be input when giving instructions to print to the cloud print server 30, for example. An arbitrary number may also be input when generating print settings information. It is then sufficient to search for print instruction information and print settings information with the same number. Alternatively, a print instruction information ID that identifies print instruction information may be generated as an identifier on the cloud side when generating print instruction information, and this identifier may be embedded into the print settings information.

Also, in these exemplary embodiments, although the cloud print server 30 is configured to transmit print instruction information to the image forming device 10 when polled from the image forming device 10, the cloud print server 30 may also be configured to transmit print instruction information to the image forming device 10 without waiting for polling.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print control device comprising:
at least one hardware processor configured to implement:
a receiver that receives, from any of at least one print instruction information holding device that holds print instruction information giving instructions to print, specific print instruction information associated with a first identifier and instructing a specific printer to print;
an acquiring unit that acquires, from other than the at least one print instruction information holding device, specific print settings information associated with a second identifier and indicating settings for printing by the specific printer;
a specifying unit that, on the basis of the first identifier and the second identifier, specifies the specific print settings information as print settings information corresponding to the specific print instruction information; and
a transmitter that transmits the specific print instruction information and the specific print settings information to the specific printer so that the specific printer uses the specific print settings information to conduct printing based on the specific print instruction information,
wherein the at least one print instruction information holding device includes at least a second hardware processor configured to implement:
a receiver that receives instructions to print from a print instructing device used by a print instructor who gives instructions to print, and
a holding unit that holds the print instruction information in response to receiving the instructions to print.

2. The print control device according to claim 1, wherein the acquiring unit acquires the specific print settings information by receiving the specific print settings information from a print settings information holding device that holds print settings information indicating settings for printing.

3. The print control device according to claim 1, wherein the acquiring unit acquires the specific print settings information by generating the specific print settings information on the basis of settings for printing by the specific printer.

4. A print system comprising:
at least one print instruction information holding device configured to hold print instruction information giving instructions to print; and
a print settings information holding device configured to hold print settings information indicating settings for printing; and
a printer configured to use the print settings information to conduct printing based on the print instruction information;
wherein the printer includes:
at least one hardware processor configured to implement:
a first receiver that receives, from any of the at least one print instruction information holding device, specific print instruction information associated with a first identifier and instructing the printer to print,
a second receiver that receives, from the print settings information holding device, specific print settings information associated with a second identifier and indicating settings for printing by the printer,
a specifying unit that, on the basis of the first identifier and the second identifier, specifies the specific print settings information as print settings information corresponding to the specific print instruction information, and
a printing unit that uses the specific print settings information to conduct printing based on the specific print instruction information,
wherein the at least one print instruction information holding device includes at least a second hardware processor configured to implement:
a receiver that receives instructions to print from a print instructing device used by a print instructor who gives instructions to print, and
a holding unit that holds the print instruction information in response to receiving the instructions to print.

5. The print system according to claim 4, wherein the print settings information holding device includes at least a third hardware processor configured to implement:
a receiver that receives the instructions to print from the print instructing device used by the print instructor who gives the instructions to print, and
a transmitter that transmits the instructions to print to the print instruction information holding device in response to receiving the instructions to print, and
the at least a second hardware processor is further configured to implement:
a receiver that receives the instructions to print from the print settings information holding device.

6. A print system comprising:
at least one print instruction information holding device configured to hold print instruction information giving instructions to print;
a print settings information holding device configured to hold print settings information indicating settings for printing;
a print control device configured to apply control so that the print settings information is used to conduct printing based on the print instruction information; and
a printer configured to use the print settings information to conduct printing based on the print instruction information;
wherein the print control device includes at least one hardware processor configured to implement:
a receiver that receives, from any of the at least one print instruction information holding device, specific print instruction information associated with a first identifier and instructing the printer to print,
an acquiring unit that acquires, from the print settings information holding device, specific print settings information associated with a second identifier and indicating settings for printing by the printer,
a specifying unit that, on the basis of the first identifier and the second identifier, specifies the specific print settings information as print settings information corresponding to the specific print instruction information, and
a transmitter that transmits the specific print instruction information and the specific print settings information to the printer,
wherein the at least one print instruction information holding device includes at least a second hardware processor configured to implement:
a receiver that receives instructions to print from a print instructing device used by a print instructor who gives instructions to print, and a holding unit that holds the print instruction information in response to receiving the instructions to print.

7. A non-transitory computer readable medium storing a program causing a computer to execute a process for realizing a print system, the process comprising:
receiving, from any of at least one print instruction information holding device that holds print instruction information giving instructions to print, specific print instruction information associated with a first identifier and instructing a specific printer to print;
acquiring, from other than the at least one print instruction information holding device, specific print settings information associated with a second identifier and indicating settings for printing by the specific printer;
specifying, on the basis of the first identifier and the second identifier, the specific print settings information as print settings information corresponding to the specific print instruction information; and
transmitting the specific print instruction information and the specific print settings information to the specific printer so that the specific printer uses the specific print settings information to conduct printing based on the specific print instruction information,
wherein the at least one print instruction information holding device includes at least a second hardware processor configured to implement:
a receiver that receives instructions to print from a print instructing device used by a print instructor who gives instructions to print, and
a holding unit that holds the print instruction information in response to receiving the instructions to print.

* * * * *